United States Patent [19]
Kawano

[11] Patent Number: 5,995,270
[45] Date of Patent: Nov. 30, 1999

[54] ULTRA-HIGH-SPEED SEMICONDUCTOR OPTICAL MODULATOR WITH TRAVELING-WAVE ELECTRODE

[75] Inventor: Kenji Kawano, Atsugi, Japan

[73] Assignee: Nippon Telegraph & Telephone Corporation, Tokyo, Japan

[21] Appl. No.: 08/951,533

[22] Filed: Oct. 16, 1997

[30] Foreign Application Priority Data

Oct. 17, 1996 [JP] Japan .................................... 8-274501
Aug. 29, 1997 [JP] Japan .................................... 9-234848

[51] Int. Cl.[6] .................................................. G02F 1/015
[52] U.S. Cl. ......................... 359/248; 359/254; 359/276
[58] Field of Search .......................... 385/2, 3; 359/245, 359/248, 254, 276

[56] References Cited

U.S. PATENT DOCUMENTS

| | | | |
|---|---|---|---|
| 5,067,788 | 11/1991 | Jannson et al. .............................. | 385/2 |
| 5,422,966 | 6/1995 | Gopalakrishnan et al. ................. | 385/2 |
| 5,647,029 | 7/1997 | Mihailidi et al. ............................ | 385/2 |
| 5,694,504 | 12/1997 | Yu et al. .................................... | 385/45 |
| 5,742,423 | 4/1998 | Ido et al. .................................. | 359/254 |
| 5,757,985 | 5/1998 | Isgizaka ..................................... | 385/2 |
| 5,771,257 | 6/1998 | Takiguchi et al. ......................... | 372/50 |
| 5,778,113 | 7/1998 | Yu .............................................. | 385/3 |
| 5,784,188 | 7/1998 | Nakamura et al. ..................... | 359/248 |

FOREIGN PATENT DOCUMENTS

| | | | |
|---|---|---|---|
| 0371 583 A2 | 8/1989 | European Pat. Off. ..................... | 1/15 |
| 0 641 049 A1 | 8/1994 | European Pat. Off. ..................... | 3/25 |
| 9-166764 | 6/1997 | Japan ......................................... | 385/2 |

OTHER PUBLICATIONS

Tatemi Ido, Shigehisa Tanaka, Makoto Suzuki, Mari Koizumi, Hirohisa Sano, and Hiroaki Inoue, Ultra–High–Speed Multiple–Quantum–Well Electro–Absorption Optical Modulars with Integrated Waveguides, Journal of Lightwave Technology, vol. 14, No. 9, Sep. 1996, pp. 2026–2034.

Isamu Kotaka, Osamu Mitomi, Koichi Wakita, Yuichi Kawamura, and Asai, High–Speed InGaAs/InAlAs Multiple–Quantum–Well Optical Modular, Electronics and Communication in Japan, Part II: Electronics, Jun. 1992, Part 2, vol./ 75, pp. 24–31.

Kawano K., Present and Future of Ultra–High Speed Optical Devices, (1306–1313) *Journal of the Institute of Electronics, Information and Communication Engineers*, vol. 76, No. 12, Dec. 1993.

Kawano K. et al., Proposal and Fabrication of a Traveling–Wave Electrode Electro Absorption(TW–EA) Modulator with Modulation Bandwidth of 50 Ghz, Abstract from the 58th Autumn Meeting of Japan Society of Applied Physics, No. 3, p. 1120, Oct. 1997.

Lin S.H., Wang S–Y, High–Throughput GaAs PIN Electrooptic Modulator With a 3–dB Bandwidth of 9.6 GHz at 1.3 $\mu$m, *Applied Optics*, 1696–1700, vol. 26, No. 9, May 1987.

(List continued on next page.)

*Primary Examiner*—Georgia Epps
*Assistant Examiner*—Margaret Burke
*Attorney, Agent, or Firm*—Workman, Nydegger & Seeley

[57] ABSTRACT

A wideband semiconductor electro-absorption optical modulator including a semiconductor core shorter in absorption-peak wavelength than a wavelength of optical signal, and an electrode for applying an electric signal to absorb the optical signal by shifting the absorption-peak wavelength to a long wavelength region when a voltage is applied, wherein an electric signal input port and an electric signal output port are disposed so that the electrode is constructed in the form of a traveling-wave electrode, and a total thickness of non-doped layers including the semiconductor core is reduced to decrease a driving voltage. Degradation of optical modulation bandwidth and reflection characteristics of the electric signal caused by mismatching of characteristic impedance to an outer circuit are reduced by decreasing an interaction length of the electric signal and the optical signal. Further, mismatching of characteristic impedance is corrected by adjusting a doping concentration of a p-type or n-type doped layer located above or beneath the semiconductor core.

18 Claims, 16 Drawing Sheets

OTHER PUBLICATIONS

Kawano K. et al., Design of InGaAs–InAlAs Multiple-Quantum-Well (MQW) Optical Modulators, 224–230, *IEEE Journal of Quantum Electronics,* vol. 28, No. 1, Jan. 1992.

Spickermann R. et al, GaAs/AlGaAs Travelling Wave Electro–Optic Modulator With an Electrical Bandwidth >40 GHz, 1095–1096, *Electronics Letters,* vol. 32, No. 12, Jun. 1996.

Agrawal N. et al., Integration of Guided Wave Devices for Very High Bitrates, 531–537, *ECIO '97 8th European Conference on Integrated Optics,* Apr. 1997.

Kawano K. et al, Polarisation–Insensitive Travelling–Wave Electrode Electroabsorption (TW–EA) Modulator With Bandwidth Over 50 GHz and Driving Voltage Less Than 2V, 1580–1581, *Electronics Letters,* vol. 33, No. 18, Aug. 1997.

ULTRA-HIGH-SPEED SEMICONDUCTOR OPTICAL MODULATOR WITH TRAVELING-WAVE ELECTRODE

This application is based on Japanese patent application Nos. 274,501/1996 filed Oct. 17, 1996, and 234,848/1997 filed Aug. 29, 1997, the contents of which are incorporated hereinto by reference.

BACKGROUND OF THE INVENTION

1. Field of the Invention

This invention relates to a semiconductor optical modulator, more specifically to an ultra-high speed semiconductor optical modulator with a traveling-wave electrode which operates at a low driving voltage, with reduced loss and in ultra-wide bandwidth.

The present invention can be applied to a future ultra-high capacity optical transmission system to be used in the U.S. and Europe.

2. Description of the Prior Art

High-speed semiconductor optical modulators studied for future high-density transmission systems can be categorized into two types. One is an electro-absorption (E-A) optical modulator with a lumped-element (L-E) electrode. The other is an electro-optic (E-O) optical modulator with a traveling-wave (T-W) electrode. The following will discuss a semiconductor electro-absorption optical modulator with a lumped-element electrode and a semiconductor electro-optic optical modulator with a traveling-wave electrode.

FIG. 1 shows a bird-view of a conventional semiconductor electro-absorption optical modulator with a lumped-element electrode. In this FIG. 1 is the p-electrode, 2 is the p⁺-InGaAs cap layer, 3 is the p-InP cladding layer, and 5 is the core. Here, an i-InGaAlAs(13 nm)/InAlAs(5 nm) multi-quantum well (MQW) core is assumed to be used for a core. Six is a n-InP cladding, 7 is a n-InP substrate, 8 is a n-electrode, and 9 is a polyimide. Here, the electrode on the polyimide 9 is called a bonding pad and 10 is a bonding wire. The electric signal supplied by a signal generator is applied to the bonding wire 10.

In order to explain the operation principle of a semiconductor electro-absorption optical modulator, an optical absorption spectrum of the MQW core 5 is shown in FIG. 2. The optical absorption peak is set at around 1.49 μm for a signal light of 1.55 μm. As shown in this figure, since the difference between the wavelength of the operating signal light and the wavelength of the absorption edge is large for the zero-biased condition (solid line A), the incident wave can be emitted without suffering significant absorption. Thus, the ON-state can be achieved. On the other hand, since the absorption spectrum is shifted toward the long wavelength region under the reverse-biased condition (broken line B), the signal light is absorbed in the i-MQW core, 5. This results in the OFF-state.

The p-electrode, 1, of this conventional semiconductor optical modulator is used for lumped-element operation. In order to explain the operation, FIG. 3 shows an equivalent circuit, which includes a driving signal generator. Here, $S_G$ is a driving signal generator, $R_G$ is its characteristic impedance, $R_L$ a termination resistor, $C_{MQW}$ is the capacitance of the i-MQW core, 5, and $C_P$ is the capacitance of the above-mentioned bonding pad. The electrical 3-dB bandwidth, $\Delta f_{el}$, for this structure can be approximately expressed as, $$\Delta f_{el} = 1/(\pi \cdot R_L \cdot C_{MQW}). \tag{1}$$

Generally, the termination resistor $R_L$ has the same characteristic impedance of 50Ω as that ($R_G$) of the driving signal generator $S_G$. Here, we assumed that since the capacitance of the pad is sufficiently small, the total capacitance can be determined by the capacitance of the i-MQW core, 5. When we assume that the thickness (d), width (W) and length (L) of the i-MQW core, 5, are respectively 0.2 μm, 2 μm and 300 μm, the capacitance of the i-MQW core, 5, can be obtained from the following equation, $$C_{MQW} = \epsilon_0 \cdot \epsilon_r \cdot W \cdot L / d. \tag{2}$$

Here, $\epsilon_0$ and $\epsilon_r$ are respectively the dielectric constant of the vacuum and the relative dielectric constant of the i-MQW core, 5.

From the Eqs. (1) and (2), the electrical 3-dB bandwidth, $\Delta f_{el}$, for the above-mentioned semiconductor lumped-element optical MQW modulator is around 20 GHz or less. Although the electrical 3-dB bandwidth, $\Delta f_{el}$, can be improved by using smaller value of $C_{MQW}$, the extinction ratio of the signal light is degraded. When we assume that $\Delta$ is the increase of the absorption coefficient and $\Gamma$ is the confinement factor of the propagating field into the i-MQW core, 5, the extinction ratio, R, of the signal light can be expressed as, $$R = \exp(-\Delta\alpha \cdot \Gamma \cdot L). \tag{3}$$

As shown in this equation, a too short i-MQW core, 5, degrades the extinction ratio. Thus, a too short i-MQW core, 5, cannot be used from the view-point of the extinction ratio.

As explained above, there is a severe trade-off between the electrical 3-dB bandwidth $\Delta f_{ef}$, which is limited by the CR-constant, and the extinction ratio. Thus, there is a great difficulty for realizing an ultra high-speed semiconductor optical modulator with a 50 GHz modulation bandwidth and a high extinction ratio.

The conventional semiconductor optical modulator with a traveling-wave electrode makes use of the electro-optic effect which means that the refractive index is changed by applying the biased voltage (R. SPICKERMANN et al., IEE Electronics Letters, vol. 32, pp. 1095–1096, 1996). The semiconductor optical modulator's equivalent circuit is shown in FIG. 4. As is well known, the modulation index, m(f), can be expressed as (S. H. Lin et al., Applied optics, vol. 26, pp. 1696–1700, 1987), $$m(f) = \frac{(1 - \Gamma_1\Gamma_2)\exp(j\beta_0 L)}{(1 + \Gamma_2)(\exp(j\beta_e L) - \Gamma_1\Gamma_2\exp(-j\beta_e L))}(V_+ + \Gamma_2 V_-), \tag{4}$$

$$V_\pm = \exp(\pm j\phi_\pm)\sin\phi_\pm / \phi_\pm$$

$$\phi_\pm = (\beta_e - \beta_0)L/2$$

$$\beta_0 = \omega_m n_0 / c_0$$

$$\beta_e = \omega_m n_m / c_0 - j\alpha_m$$

$$\Gamma_1 = \frac{Z - R_G}{Z + R_G} \tag{5}$$

$$\Gamma_2 = \frac{Z - R_L}{Z + R_L},$$

where L is an interaction length between the electric signal and light, i. e. the length of the traveling-wave electrode. And, $n_o$ and $n_m$ are respectively the effective indexes of the optical wave and electric signal. Here, ωm is the angular frequency of the electric signal, $C_0$ is light velocity in the vacuum, αm is the microwave attenuation factor, and Z is the characteristic impedance of the semiconductor optical modulator using the traveling-wave electrode.

Since the characteristic impedance of the conventional optical modulator is 50Ω, the non-doped layer, which does not have intentional doping, is thick. Furthermore, the electro-optic effect, i.e. index change effect, is small even for the case of a MQW core structure. Thus, the traveling-wave electrodes have long interaction lengths of the order of millimeters.

Next, the influence of the electrode length on the modulation bandwidth will be qualitatively discussed. For simplicity, by assuming the velocity matching between electric signal and light ($n_m = n_o$) and impedance matching between a semiconductor optical modulator and outer circuits ($Z = R_G = R_L$), the following simple relation can be obtained from Eq. (4) for the modulation bandwidth, $\Delta f$, $$\Delta f \, 1/(\alpha_m L)^2. \tag{6}$$

Therefore, long traveling-wave electrodes significantly degrade the modulation bandwidth due to the electrode conductor loss.

Thus, it was almost impossible to realize a high-speed semiconductor electro-optic optical modulator with a low-driving voltage by making use of a traveling-wave electrode.

Recently, one traveling-wave semiconductor electro-absorption modulator has been reported (N. Agrawal, et al., European conf. Integ. Opt. (ECIO), 1997, Paper EFB3-1). It has a relatively short interaction length (500 µm), but its modulation bandwidth was limited to 18 GHz (3-dB electrical) and no data has been reported on the driving voltage, intrinsic layer thickness, and characteristic impedance.

SUMMARY OF THE INVENTION

The present invention provides an ultra-high speed semiconductor optical modulator with a traveling-wave electrode which is superior in optical modulation bandwidth.

The present invention further provides a semiconductor optical modulator, which has both advantages of a lumped-element electrode construction and a traveling-wave electrode construction, is low in driving voltage and insertion loss, and has optical modulation characteristics of ultra-wide bandwidth.

A first aspect of the present invention, an ultra-high speed semiconductor optical modulator with a traveling-wave electrode comprising a semiconductor core which is shorter in absorption-peak wavelength than a wavelength of optical signal, and an electrode for applying an electric signal to absorb the optical signal by shifting the absorption-peak wavelength to a long wavelength region when the voltage is applied, wherein the electrode is constructed in the form of a traveling-wave electrode, which can be applied with an electric signal to one end thereof and an electric signal can be taken out from the other end.

Here, the other end of the traveling-wave electrode may be connected with a termination resistor.

Further, a characteristic impedance of an outer circuit connected to the other end may be equal to the characteristic impedance of the optical modulator.

Still further, a non-doped semiconductor layer may be provided between the semiconductor core and an upper cladding layer located thereabove. A non-doped semiconductor layer may be provided between the semiconductor core and a lower cladding layer located therebeneath. Yet further, non-doped semiconductor layers may be provided individually between the semiconductor core and the upper cladding layer located thereabove, and between the semiconductor core and the lower cladding layer located therebeneath.

In the first aspect of the present invention, a voltage is applied and thereby the absorption-peak wavelength of the semiconductor core is shifted to the long wavelength region, whereby forming the electrode for applying the voltage to absorb the optical signal into the semiconductor core as a traveling-wave electrode. More specifically, an electric signal (i.e. voltage) input port is provided at the optical signal input side, and an electric signal output port is provided at the optical signal output side. With this construction, the electric signal and optical signal run in the same direction. With the construction according to the present invention, a problem in that an electrical 3-dB bandwidth $\Delta f_{el}$ is limited by CR constant is eliminated. Therefore, in particular, when the electric signal and optical signal are velocity matched, length of the semiconductor core for absorbing light when light is off can be increased, thereby achieving ultra-high speed optical modulation while maintaining a high extinction ratio.

A second aspect of the present invention, an ultra-high speed semiconductor optical modulator with a traveling-wave electrode comprising a semiconductor core shorter in absorption-peak wavelength than a wavelength of optical signal, and an electrode for applying an electric signal to absorb the optical signal by shifting the absorption-peak wavelength to a long wavelength region when the voltage is applied, wherein the electrode is constructed in the form of a traveling-wave electrode, which can be applied with an electric signal to one end thereof and an electric signal can be taken out from the other end, and a total thickness of non-doped semiconductor layers including the semiconductor core is decreased so that a driving voltage of electric signal is reduced.

Here, by decreasing the interaction length of the electric signal and optical signal, degradation of optical modulation bandwidth and reflection characteristics of electric signal due to a characteristic impedance mismatching between an outer circuit and the traveling-wave electrode caused by decreasing the total thickness of non-doped semiconductor layers including the semiconductor core may be reduced.

Further, by adjusting a doping concentration of a p-type doped layer located above or beneath the semiconductor core, the mismatching of the characteristic impedance may be corrected. Still further, by adjusting the doping concentration of an n-type doped layer located above or beneath the semiconductor core, the mismatching of the characteristic impedance may be corrected.

Yet further, the non-doped semiconductor layer may be free of a semiconductor layer other than the semiconductor core. Yet further, in the non-doped semiconductor layer, the semiconductor layer other than the semiconductor core, if present, may be very small in thickness.

Yet further, the total thickness of the non-doped semiconductor layers including the semiconductor core may be less than approximately 0.5 µm. Yet further, the interaction length of the electric signal and optical signal may be less than approximately 400 µm. Yet further, the characteristic impedance of the traveling-wave electrode may be less than approximately 40Ω.

Yet further, it may be that the total thickness of non-doped semiconductor layers including the semiconductor core is less than approximately 0.5 µm, the interaction length of the electric signal and optical signal is less than approximately 400 µm, and the characteristic impedance of the traveling-wave electrode is less than approximately 40Ω.

Yet further, the other end of the traveling-wave electrode may be connected with a termination resistor.

With the second aspect of the present invention, since the total thickness of non-doped semiconductor layers is decreased, an electric field strength in a MQW core increases and, as a result, a shift amount in absorption-peak wavelength of the MQW core can be increased, thereby reducing the driving voltage necessary for obtaining a desired extinction ratio.

Yet further, when the total thickness of non-doped semiconductor layers is decreased, there may be a case in which the characteristic impedance is decreased and, as a result, degradations in optical modulation bandwidth and reflection of the electrical signal are caused. However, this decrement of the characteristic impedance can be compensated by setting an interaction length L of electric signal and light to a shorter value, and optical insertion loss can be suppressed thereby.

Yet further, by adjusting the doping concentration of the doped layer located above or beneath the MQW core matching of the characteristic impedance can be compensated, thereby optical modulation of wider bandwidth can be achieved and the reflection of the electrical signal can be suppressed.

Therefore, according to the present invention, a semiconductor optical modulator can be achieved which has both advantages of lumped-element electrode construction and traveling-wave electrode construction, is low in driving voltage, and has ultra-wide-band optical modulation characteristics.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

<First Embodiment>

Figure 5:
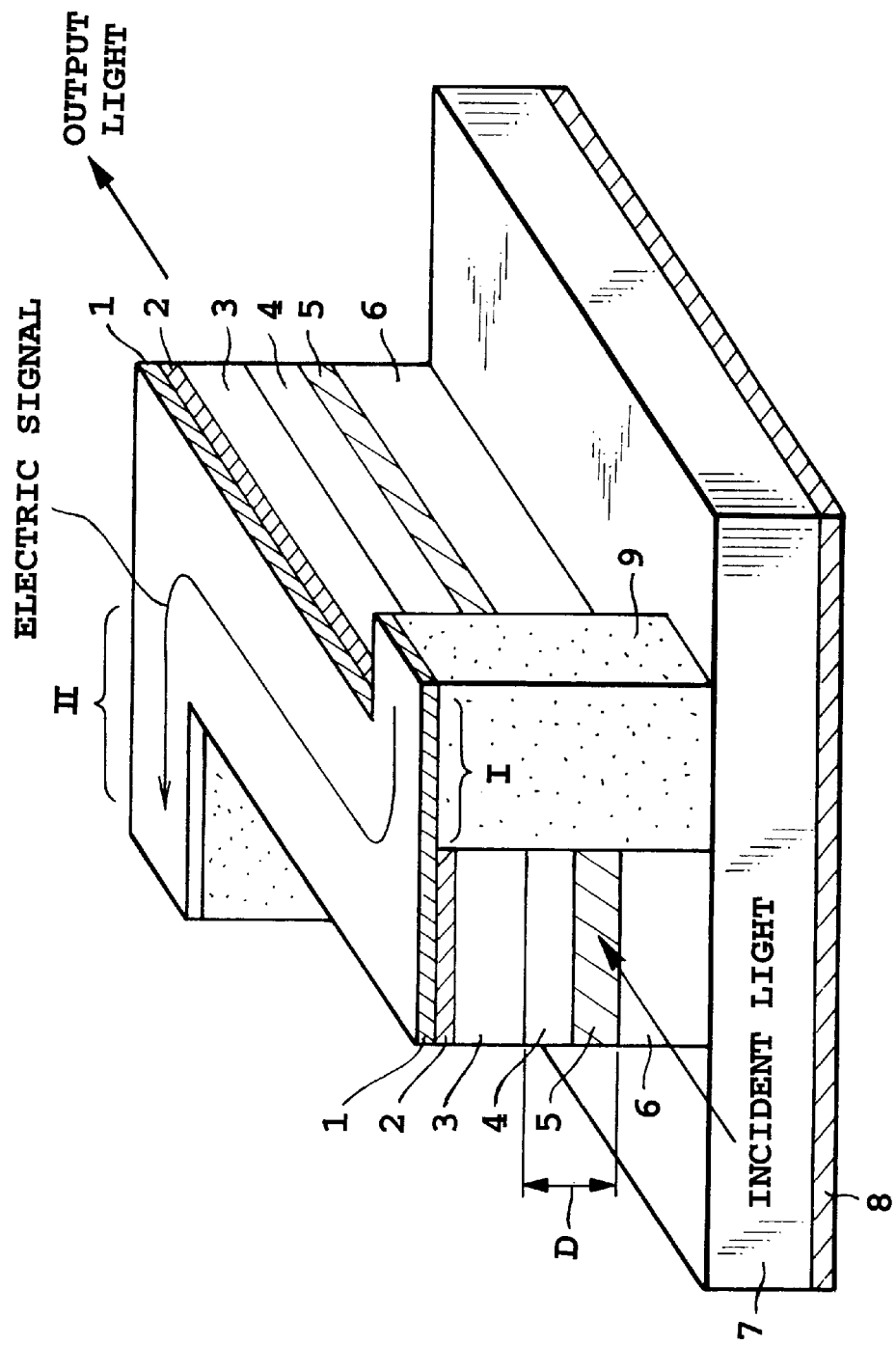
FIG. 5 is a schematic view showing the structure of the semiconductor optical modulator with a traveling-wave electrode according to a first embodiment of the present invention.

A first embodiment of the present invention is shown in FIG. 5. In the figure, as in the prior art example, the reference numeral 1 indicates a p-side electrode, 2 is a p$^+$-InGaAs cap layer, 3 is a p-InP cladding layer, 5 is a core layer, and also in the present embodiment, an i-InGaAlAs (130 Å)/InAlAs(50 Å) multi-quantum well (MQW) is exemplified. The reference numeral 6 indicates an n-InP cladding layer, 7 is an n-InP substrate, and 8 is an n-side electrode. The reference numeral 9 indicates a polyimide layer, and 4 is an i-InP layer. Such a structure can be fabricated by a conventional semiconductor device fabrication technology.

Figure 1:
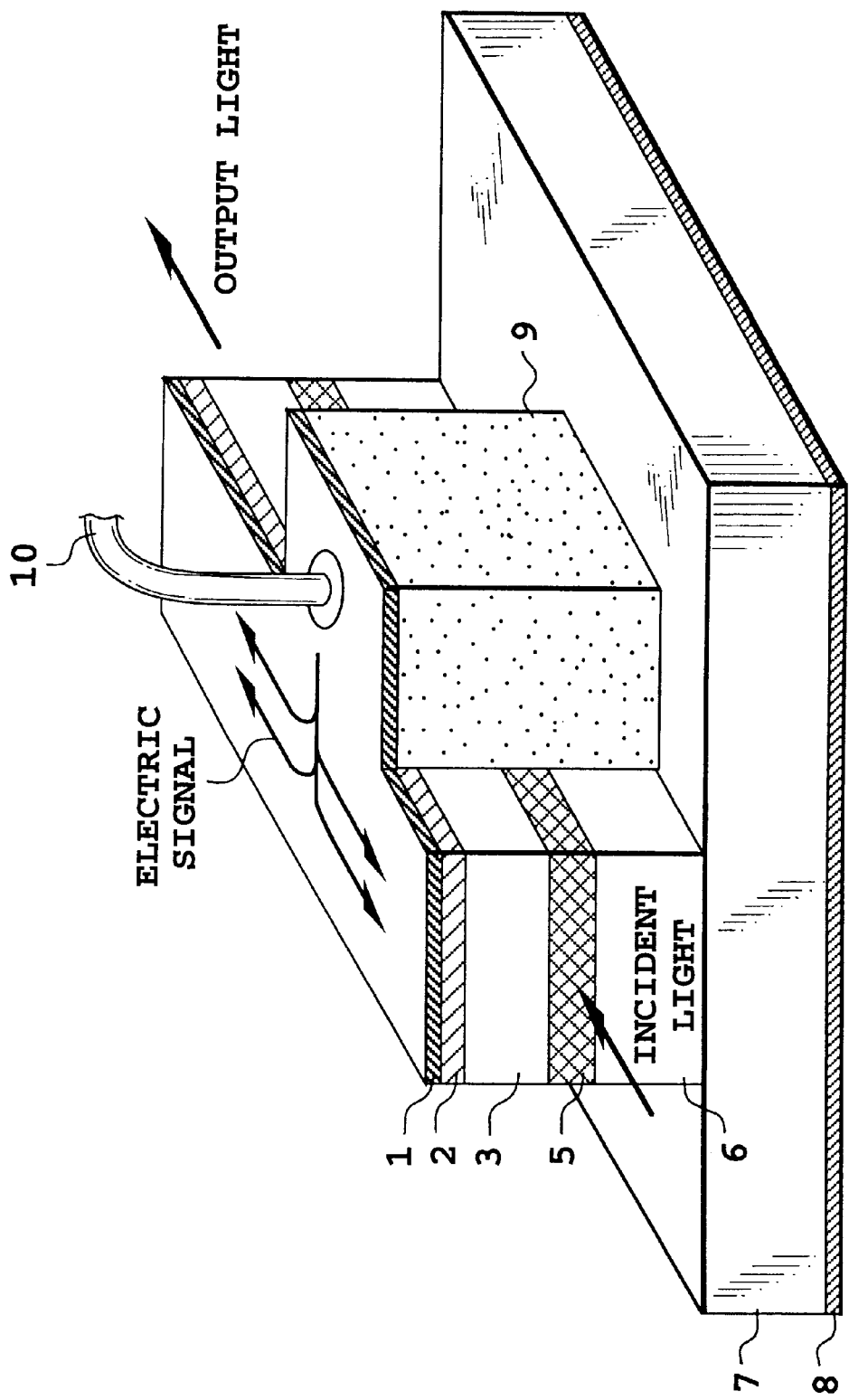
FIG. 1 is a schematic view showing the structure of a prior art semiconductor electro-absorption optical modulator with a lumped-element electrode.
Figure 2:
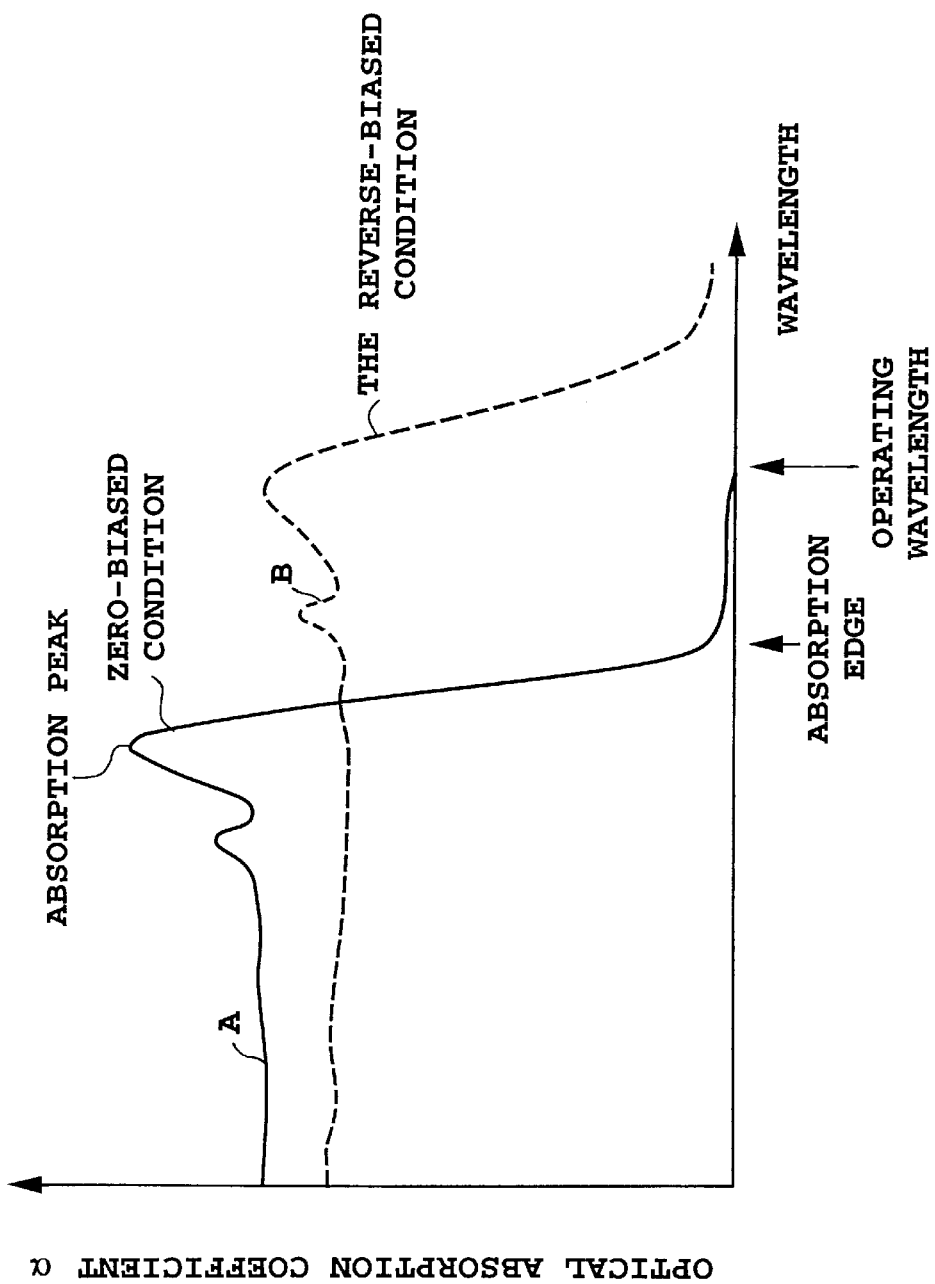
FIG. 2 is a graph showing an optical absorption spectrum characteristic of MQW core of the prior art semiconductor optical modulator.
Figure 3:
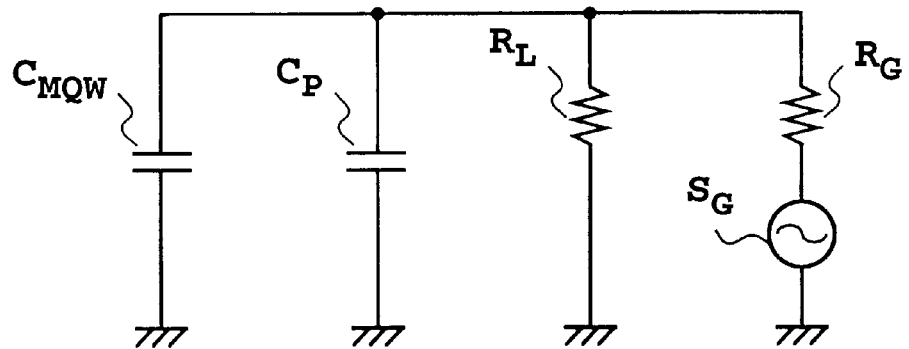
FIG. 3 is a circuit diagram showing an equivalent circuit including an outer driving circuit and a prior art semiconductor optical modulator with a lumped-element electrode.

Here, a major difference of the present embodiment from the prior art example shown in FIG. 1 is that the p-side electrode, 1, is a traveling-wave electrode. The electrode located above the polyimide layer, 9, is an electric signal input port, I, which is inputted with an electric signal (reverse-bias voltage) from a driving signal generator (not shown). On the other hand, an output port, II, is provided on the electrode of the optical signal output side, which is connected with a termination resistor. That is, during the time when light is inputted and propagates in the i-MQW optical modulator, the electric signal also propagates in the same direction over the entire length of the optical modulator. Since, during the time when both signals run in the same direction, by the electric signal the absorption-peak wavelength of the i-MQW core is shifted to the long wavelength region, as a result, the light is absorbed resulting in the off-state.

In the present embodiment, the p-side electrode, 1, is a traveling-wave electrode. However, since the characteristic impedance of the electric signal generator $S_G$ is 50Ω, it is desirable that the characteristic impedance of the electro-absorption MQW is equal to or in the vicinity of 50Ω. Therefore, in the present embodiment, the i-InP layer, 4, is provided between the MQW core, 5, and the p-InP cladding layer, 3, so that the characteristic impedance of the MQW modulator including the p-side electrode, 1, is 50Ω. The termination resistor connected to the output port, II, of the electrode 1 has a resistance of 50Ω.

The electrical 3-dB modulation bandwidth $\Delta f_{el}$ of the semiconductor electro-absorption optical modulator with the traveling-wave electrode, for simplicity, when the microwave propagation loss of the traveling-wave electrode is assumed as 0 and the characteristic impedance as 50Ω, is represented as $$\Delta f_{el} = 1.4\, C_0/(\pi(|n_m - n_0|)L). \tag{7}$$

Here, $c_o$ is light velocity, $n_m$ is an effective index of the MQW optical modulator to the electric signal, $n_o$ is an effective index of the modulator to the signal light, and L is an interaction length of the traveling-wave electrode and the i-MQW core 5. Therefore, from Eq. (7), when L is set at 300 μm, $n_m$ at 3.4, and $n_o$ at 3.2, ultra-wide-band optical modulation can be achieved with $\Delta f_{el}$ of about 2200 GHz.

Further, when the electric signal and optical signal are velocity matched, that is, when $n_m = n_o$, the bandwidth limitation factor is only the microwave propagation loss of the electrode even when the length L of the i-MQW core, 5, is increased to increase the extinction ratio R of light. Since the microwave propagation loss can be reduced by increasing the thickness of the electrode and so on, this can also achieve ultra-wide-band operation of the optical modulator.

Still further, in the present embodiment, the entire multilayer structure above the lower cladding layer, 6, is ridge-formed and the side surface of the i-MQW core is exposed to the air. That is, a so-called high-mesa-structured optical modulator is shown. Of the multilayer structure, only part of the i-InP layer 4, the upper cladding layer, 3, the InGaAs cap layer, 2, and the p-side electrode, 1, may be ridge-formed to form a so-called strip loaded configuration.

Yet further, in the present embodiment, the i-InP layer, 4, is provided between the i-MQW core, 5, and the upper cladding layer, 3. However, the i-InP layer may be provided between the i-MQW core, 5, and the lower cladding layer, 6. This construction avoids increasing of signal voltage to produce a depletion layer in the i-MQW core, 5, particularly even when the purity of the non-doped MQW core and the InP layer is not sufficiently high. Of course, the non-doped InP layer may be provided both above and beneath the MQW core, 5.

Since, in the present invention, it is sufficient that the electrode is a traveling-wave electrode, needless to say configurations of the p-side and n-side electrodes are not important, and a semi-insulating substrate may be used as the substrate. Further, the i-MQW core, 5, may be other MQW compositions such as i-InGaAs/InP, and it is also possible to use a quarternary bulk composition such as i-InGaAsP.

As described above, with the first embodiment of the present invention which uses a traveling-wave electrode, a semiconductor electro-absorption optical modulator which is superior in terms of optical modulation bandwidth can be achieved without degrading the extinction ratio.

<Second Embodiment>

In the first embodiment of the present invention, the p-side electrode, 1, for applying the electric signal is a traveling-wave electrode, that is, during the time when light is inputted and propagates in the MQW optical modulator, the electric signal also propagates in the same direction as the light over the entire length of the optical modulator and the modulation characteristics is determined from Eq. (4). Since, during the time when both signals run in the same direction, by the electric signal the absorption-peak wavelength of the i-MQW core, 5, is shifted to the long wavelength region, then the light is absorbed resulting in the off-state. Further, since the electrode is a traveling-wave electrode, the p-side electrode, 1, as shown in FIG. 5, is provided with an electric signal input port, I, and output port, II. The output port is connected with a 50Ω termination resistor.

Since, in general, the characteristic impedance of the electric signal generator $S_G$ is 50Ω, in the first embodiment, it is considered that the characteristic impedance of the traveling-wave electrode is preferably equal to or in the vicinity of 50Ω, the thickness D of the total doped layers is increased by providing the i-InP layer, 4, between the MQW core, 5, and the p-InP cladding layer, 3, so that the characteristic impedance of the MQW modulator including the p-side electrode, 1, is 50Ω.

As well known, shift amount of absorption-peak wavelength of the i-MQW core, 5, is proportional to the square of electric field strength applied. Specifically, when the thickness of the i-InP layer 4 is increased so as to set the characteristic impedance Z of the traveling-wave electrode at 50Ω, the electric field in the i-MQW core, 5, is decreased inversely proportional to the total thickness D of the non-doped layers, however, the shift amount of absorption-peak wavelength of the i-MQW core, 5, is decreased inversely proportional to the square of the total thickness D as described above. Therefore, the driving voltage to obtain a desired extinction ratio is increased proportional to the square of the total thickness D of the non-doped layers.

Figure 6:
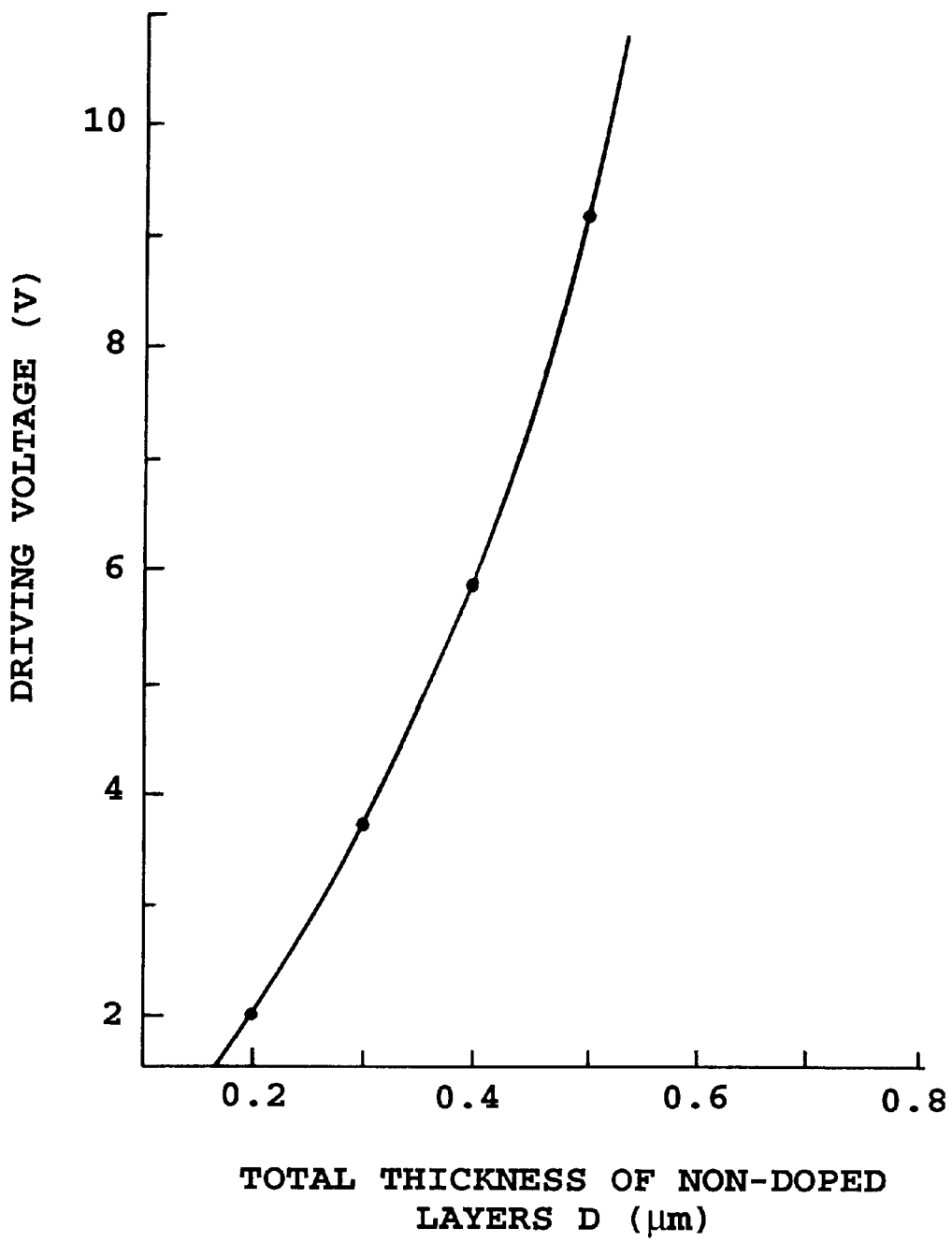
FIG. 6 is a graph showing the relationship between total thickness of non-doped layers D of MQW core shown in FIG. 5 and a driving voltage.

FIG. 6 shows this condition when the thickness of the MQW core, 5, is 0.2 μm (driving voltage to achieve an extinction ratio 20 dB is 1.5 V). That is, when the thickness of the i-InP layer, 4, is increased so that the characteristic impedance Z of the traveling-wave electrode is in the vicinity of 50Ω, the driving voltage is increased. It can be recognized from FIG. 6 that, for example, when the total thickness of the non-doped layers is assumed as 0.6 μm, the driving voltage is as high as 13.5V.

The i-MQW core, 5, has a length of 200 μm. The value of 0.6 μm of the non-doped layers described here is the maximum thickness in the experiments ever conducted. In order to achieve an actual 50Ω system, it is necessary that the total thickness D of the non-doped layers is about half the width of the ridge, that is, about half the width of the i-MQW core, 5, in FIG. 11. Therefore, when the ridge width is assumed as about 2 μm which is a width of common optical waveguides, the total thickness D of the non-doped layers is as large as about 1 μm and then the driving voltage is considerably increased.

On the other hand, where an increase in absorption coefficient of the i-MQW core, 5, by applying voltage is Δα, a confinement factor (confinement rate) of the guided wave to the i-MQW core, 5, is Γ, and an interaction length of the traveling-wave electrode and the optical waveguide comprising the i-MQW core, 5, is L, an extinction ratio R of the electro-absorption optical modulator is represented by Eq. (3) shown above (K. Kawano et al., IEEE Journal of Quantum Electronics, vol. 28, pp. 224–230, 1992).

Then, as can be seen from Eq. (3) shown above, degradation of electric field in the i-MQW core 5 by increasing the total thickness D of the above-described non-doped layers and, in turn, degradation in extinction ratio can be compensated by increasing the interaction length L of electric signal and light. As described above, in the arrangement of the first embodiment shown in FIG. 5, it is necessary to increase the interaction length L. However, in the electro-absorption optical modulator, since the absorption-peak wavelength of the i-MQW core, 5, is relatively close to the operating wavelength (for example, for an operating wavelength of 1.55 μm, absorption-peak wavelength is 1.49 μm), as can be seen from the light absorption factor shown by the following formula, $$\exp(-\alpha_0 \cdot \Gamma \cdot L), \tag{8}$$

propagation loss of light is increased when voltage is not applied and, as a result, insertion loss as the optical modulator is increased. Here, $\alpha_0$ is a light absorption coefficient at the operating wavelength when a voltage is not applied.

That is, the semiconductor electro-absorption optical modulator with the traveling-wave electrode according to the first embodiment still has a point that has yet to be solved in that the driving voltage is increased or insertion loss is high.

Then, the second embodiment of the present invention provides a semiconductor electro-absorption optical modulator with a traveling-wave electrode, which is superior in terms of the driving voltage and insertion loss.

Figure 7:
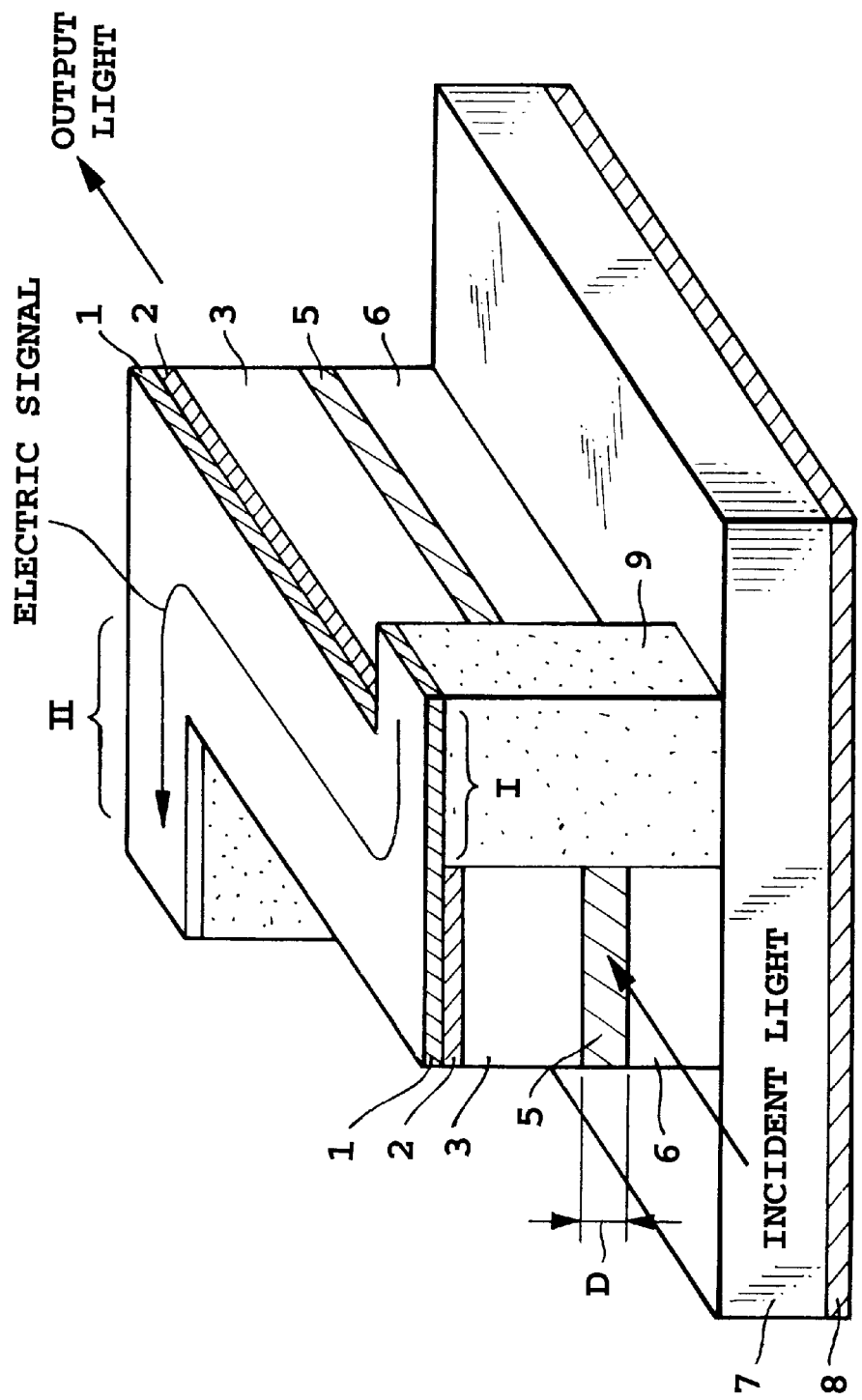
FIG. 7 is a schematic view showing the structure of the semiconductor optical modulator with a traveling-wave electrode according to a second embodiment of the present invention.

FIG. 7 shows the structure of the wide-band semiconductor electro-absorption optical modulator according to the second embodiment of the present invention. Here, same as the first embodiment shown in FIG. 5, the i-MQW core, 5, comprises, for example, an InGaAlAs well (thickness: 130 Å) and an InAlAs barrier (thickness: 50 Å), the total thickness thereof is about 0.1 to 0.5 μm. The i-MQW core, 5, has a width of about 1 to 2 μm. Unlike the first embodiment shown in FIG. 5, the second embodiment of the present invention has not the i-InP layer, 4, or if present, since it is very thin, as can be seen from FIG. 6, there is no increasing factor of the driving voltage. Therefore, it can be seen that the semiconductor electro-absorption optical modulator according to the second embodiment of the present invention operates at a low driving voltage. However, the characteristic impedance Z of the traveling-wave electrode is lower than 50Ω (for example, about 20Ω). If the characteristic impedance of the outer driving circuit is matched with the characteristic impedance Z of the traveling-wave electrode (about 20Ω in this example), the optical modulator according to the second embodiment of the present invention is possible for wideband operation even when the interaction length L is increased to some degree (for example, 300 μm).

However, if the outer driving circuit is a 50Ω system, in the second embodiment the interaction length L of the electric signal and light is decreased. That is, the length of the i-MQW core, 5, is decreased. Other structure shown in FIG. 7 is almost the same as that of the first embodiment shown in FIG. 5.

In general, the reason why the characteristic impedance Z of the traveling-wave electrode is preferably 50Ω is that the outer driving circuit is often the 50Ω system and the characteristic impedance is to be matched between the optical modulator and the outer circuit being the 50Ω system. Influences of the low characteristic impedance on the optical modulation bandwidth due to a decrease in the thickness D of the non-doped layers according to the present invention will be discussed below.

Figure 4:
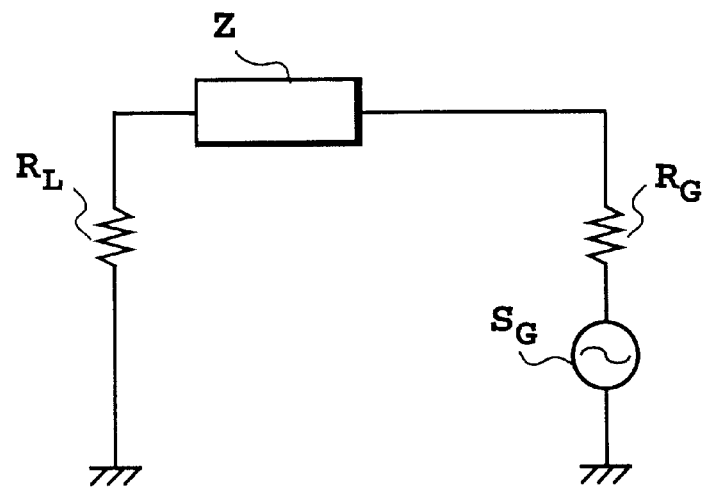
FIG. 4 is an equivalent circuit diagram when operating a prior art semiconductor optical modulator with a traveling-wave electrode utilizing a change in refractive index.

The equivalent circuit including the outer driving circuit and the semiconductor electro-absorption optical modulator with the traveling wave electrode is the same as the prior art example shown in FIG. 4, where $S_G$ is a driving signal generator, $R_G$ is a characteristic impedance of the driving signal generator, $R_L$ is a termination resistor, and Z is a characteristic impedance of the optical modulator. An optical 3-dB modulation bandwidth Δf of the semiconductor electro-absorption optical modulator with the traveling-wave electrode can be calculated using this equivalent circuit model.

For example, the optical 3-dB modulation bandwidth Δf, for simplicity, when the microwave propagation loss of the traveling-wave electrode is assumed as 0 and the characteristic impedance Z is assumed as 50Ω is represented as:

$$\Delta f = 1.9 C_0/(\pi(|n_m - n_0|)L), \tag{9}$$

(K. Kawano., The Journal of the Institute of Electronic, Information and Communication. Engineers pp. 1306–1313, Dec. 1993). Here, $C_0$ is light velocity, $n_m$ is an effective index of the MQW optical modulator to the electric signal, $n_0$ is an effective index of the signal light, and L is an interaction length of the traveling-wave electrode and the i-MQW core, 5.

Figure 8:
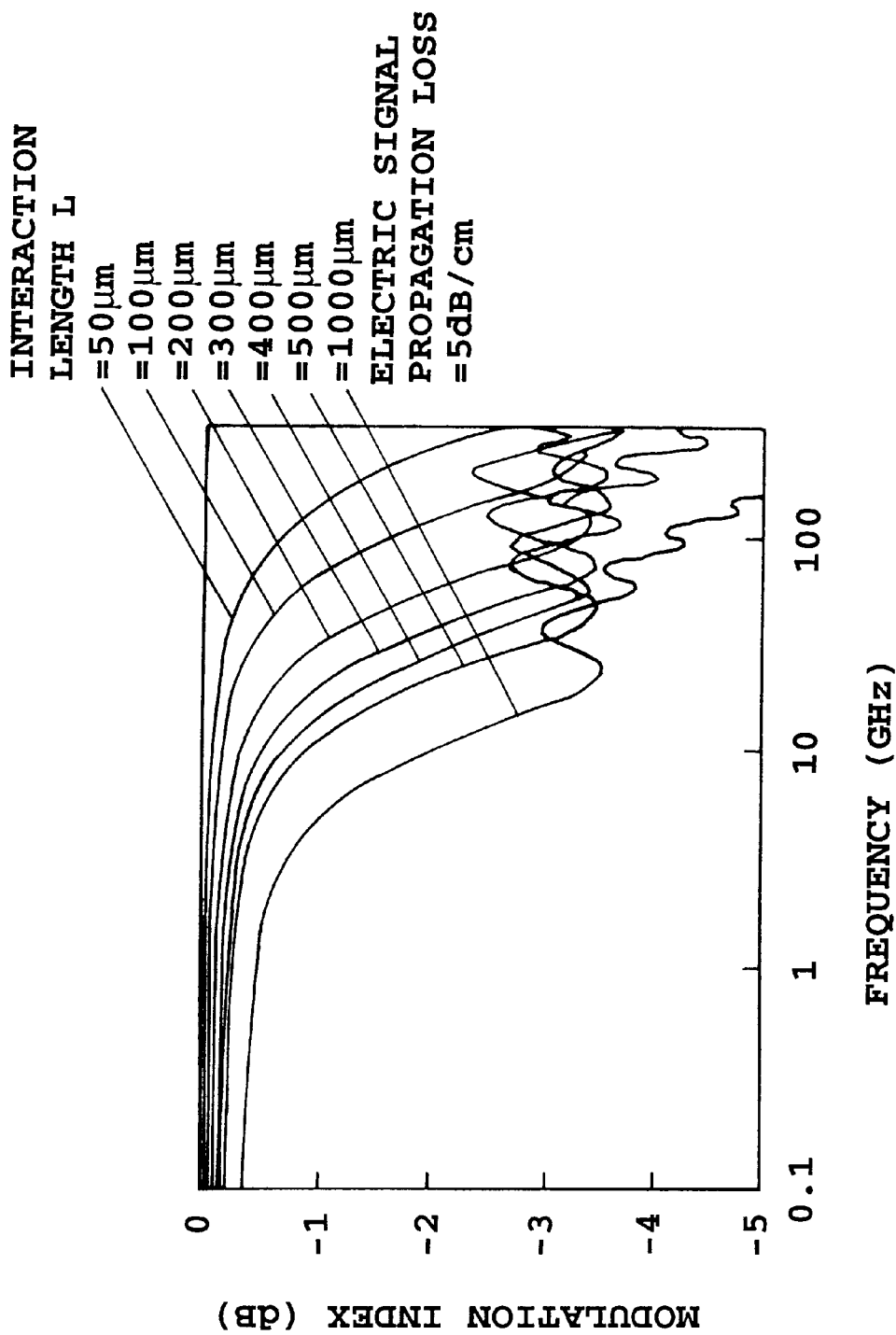
FIG. 8 is a graph for explaining the principle of the second embodiment according to the present invention, showing an influence of microwave propagation loss $\alpha_m$ of a traveling-wave electrode on optical modulation characteristics when the microwave propagation loss $\alpha$ is small ($\alpha_m$=5 dB/cm)
Figure 9:
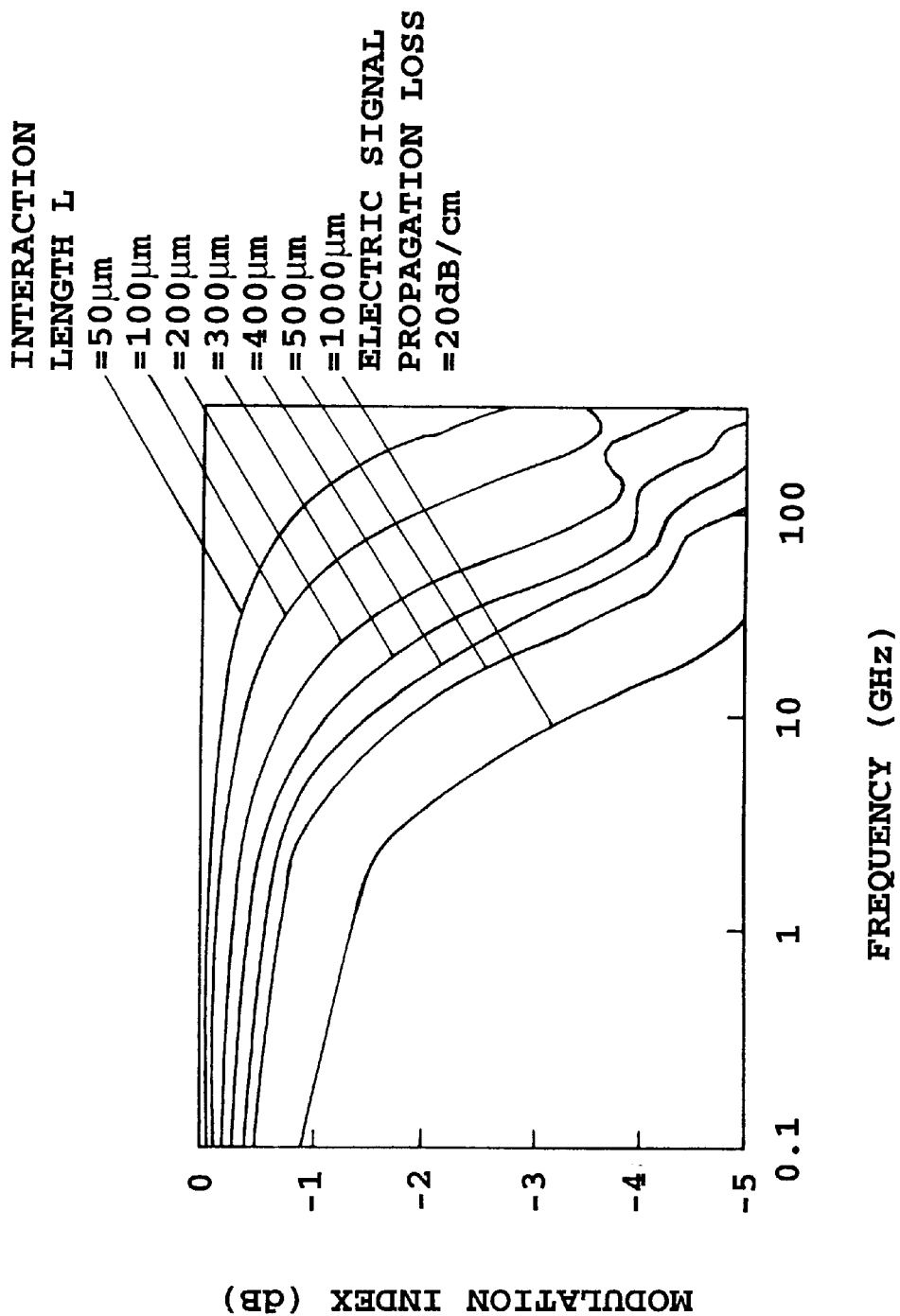
FIG. 9 is a graph for explaining the principle of the second embodiment according to the present invention, showing an influence of microwave propoagation loss $\alpha_m$ of a traveling-wave electrode on optical modulation characteristics when the microwave propagation loss $\alpha_m$ is large ($\alpha_m$=20 dB/cm)

Optical modulation characteristics, determined by assuming the effective index $n_m$ of the MQW modulator to the electric signal as 4.0 and the effective index to the signal light as 3.2, are shown in FIGS. 8 and 9. To clarify the effects of the microwave propagation loss $\alpha_m$ of the traveling-wave electrode, FIG. 8 shows a case when the microwave propagation loss $\alpha_m$ is small ($\alpha_m$=5 dB/cm), and FIG. 9 shows a case when the electric signal propagation loss $\alpha_m$ is large ($\alpha_m$=20 dB/cm). The characteristic impedance Z of the optical modulator was 20Ω. Further, the interaction length L (in FIG. 7, the length of the i-MQW core, 5 ) of the electric signal and light was varied as a parameter from 50 μm to 1 mm.

Still further, the characteristic impedance of the outer circuit (characteristic impedance $R_G$ of the driving signal generator and characteristic impedance $R_L$ of the termination resistor) was assumed as 50Ω.

As can be seen from FIG. 8, when the characteristic impedance is low, a case in which the optical 3-dB modulation bandwidth Δf becomes narrower than 20 GHz is the case where the interaction length of electric signal and light is as long as about 1 mm. However, when the interaction length L is as short as about 50 to 100 μm, ultra-wide-band optical modulation of several 100 GHz is possible even with the traveling-wave electrode of low characteristic impedance as used in the present embodiment.

Figure 10:
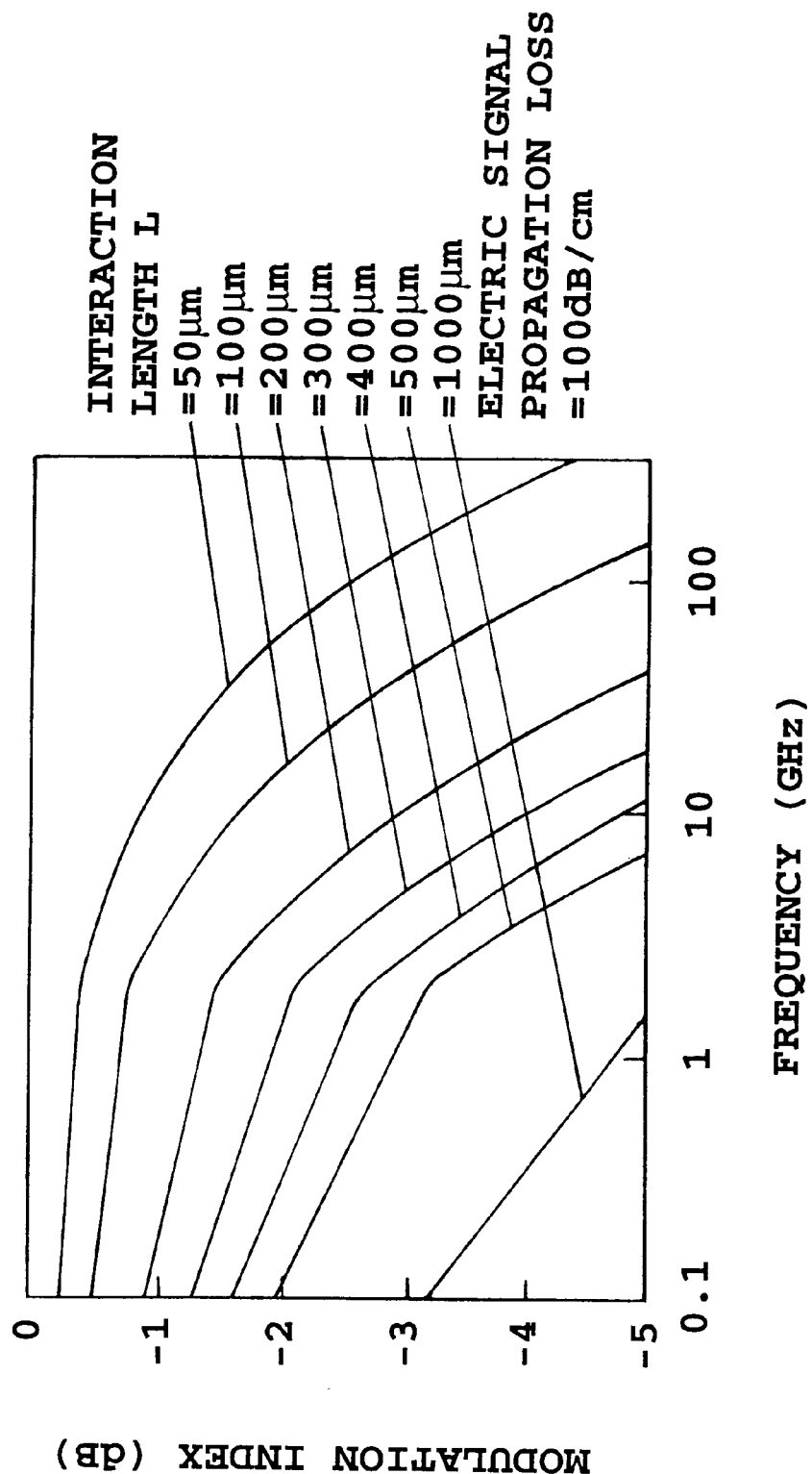
FIG. 10 is a graph for explaining the principle of the second embodiment according to the present invention, showing calculation results of optical modulation characteristics when the microwave propagation loss $\alpha_m$ of the traveling-wave electrode is very large ($\alpha_m$=100 dB/cm)

Further, FIG. 9 shows a calculated result of optical modulation characteristics when the microwave propagation loss $\alpha_m$ of the traveling-wave electrode is relatively large as 20 dB/cm, and FIG. 10 shows a calculated result of optical modulation characteristics when the electric signal propagation loss $\alpha_m$ of the traveling-wave electrode is very large as 100 dB/cm. As can be seen in FIGS. 9 and 10, the present invention has advantages that since the interaction length L is short, a wide modulation bandwidth of more than 100 GHz can still be achieved even with these microwave propagation losses.

Because the characteristic impedance of the optical modulator is low, there is a fear of reflection of electric signal from the optical modulator to the driving signal generator $S_G$. However, this is not a problem since the interaction length L of the optical modulator is sufficiently short as compared with the driving microwave wavelength (about 1 mm on the n-InP substrate 7 at a modulation frequency of 100 GHz). That is, an important point in the present invention is that as a result of decreasing the total thickness D of the non-doped layers to decrease the driving voltage, wideband optical modulation can be achieved by shortening the interaction length L of electric signal and light even when the characteristic impedance z is considerably different from 50Ω.

Yet further, since the length of the MQW core layer, 5, of large absorption is shorter, optical insertion loss can also be reduced. It has been described that the interaction length L is preferably very short as 50 to 100 μm. However, even when the interaction length L is slightly longer as less than 200 μm, less than 300 μm, or less than 400 μm, the effect of the present invention can be achieved although with slight degradation of the modulation index, for example, as shown in FIG. 8.

Figure 11:
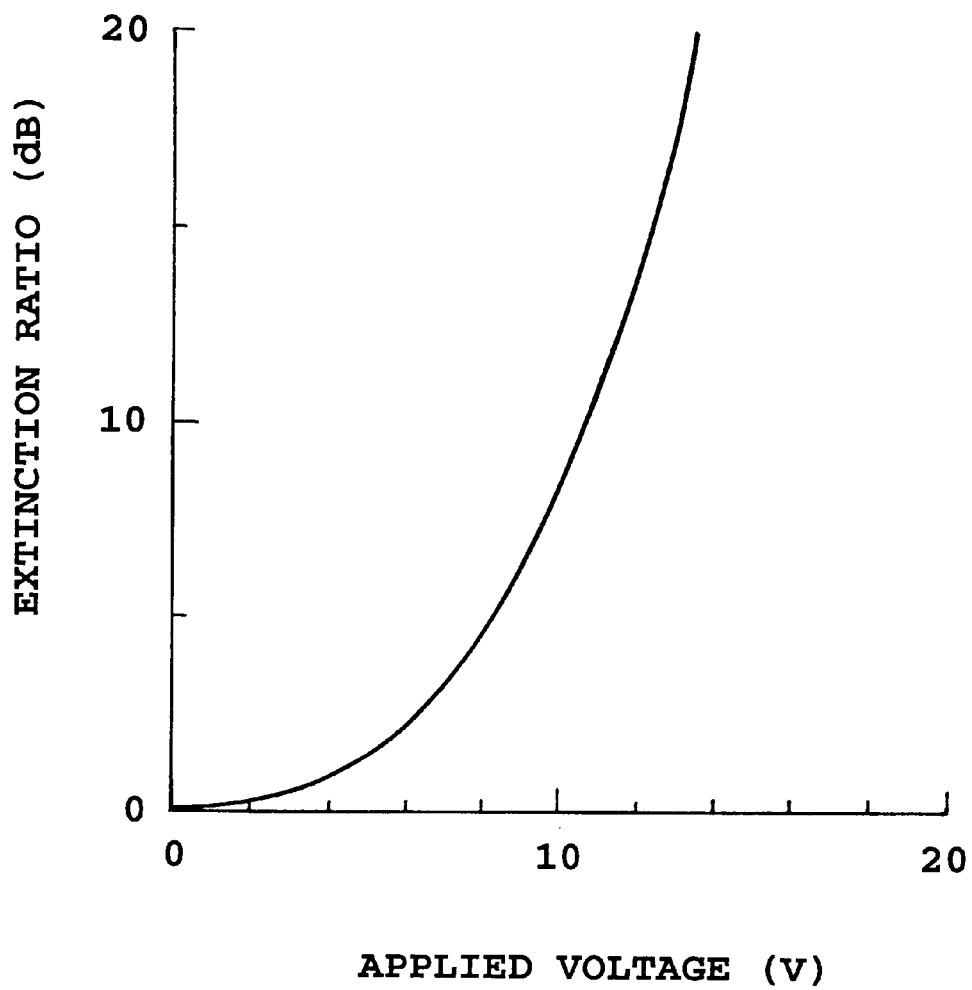
FIG. 11 is a graph for explaining extinction characteristics vs. applied voltage of the semiconductor MQW modulator of the first embodiment shown in FIG. 5.

FIG. 11 shows the relationship between the extinction ratio and applied voltage when the thickness and the length of the i-MQW core, 5, are 0.6 μm and 200 μm, respectively. As can be seen in FIG. 11, the extinction ratio is small in the region where the applied voltage is low and rapidly increases as the applied voltage increases (refer to Eq. (3)).

On the other hand, dB expression of the extinction ratio is obtained by operating 10 log to the above Eq. (8), which is proportional to the length L of the i-MQW core, 5. Here, driving voltage reduction effect by increasing the length L of the i-MQW core, 5, will be discussed in the following.

Figure 12:
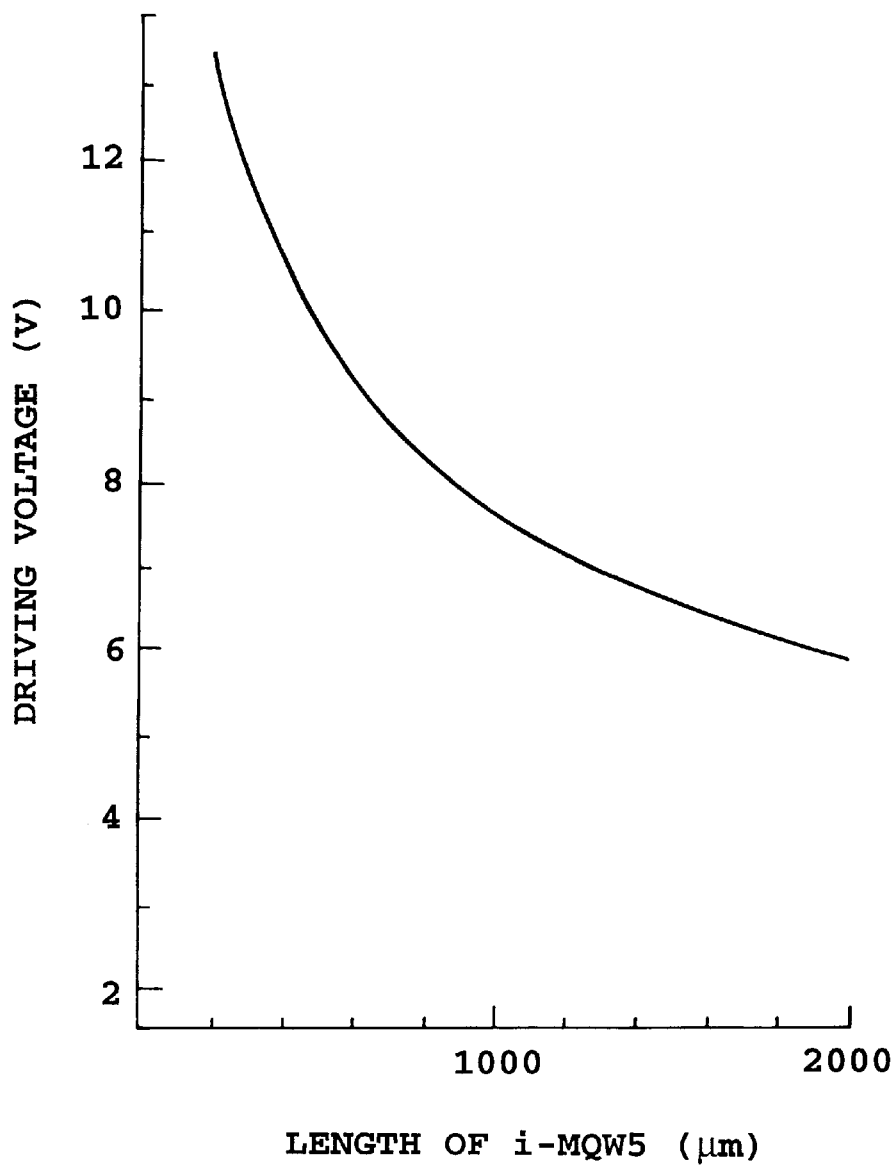
FIG. 12 is a graph for explaining a dependence of the length of i-MQW core on driving voltage of the semiconductor MQW modulator of the first embodiment shown in FIG. 5.

First, as can be seen from FIG. 11, to obtain an extinction ratio of 20 dB when the length L of the i-MQW core, 5, is 200 μm, the applied voltage is 13.5V, which is the driving voltage. When the length L is doubled to 400 μm, to obtain the extinction ratio of 20 dB, in FIG. 11 which is shown for the case where the length L is 200 μm, the applied voltage for the extinction ratio 10 dB is the driving voltage, which is about 10.5 V. That is, even when the length is doubled, the driving voltage is decreased by only 3 V from 13.5 V, rather than halved. FIG. 12 shows the relationship between the length L of the i-MQW core, 5, and the driving voltage for the case where the thickness of the i-MQW core, 5, is as thick as 0.6 μm. As described above, it is confirmed that the driving voltage cannot be remarkably reduced even when the length L of the i-MQW core, 5, is increased. Further, since it has been experimentally confirmed that the electro-absorption i-MQW core, 5, has a light propagation loss of 100 to 300 dB/cm, light propagation loss will become considerably large if the length L is increased (light propagation loss is 10 to 30 dB when the length L of the i-MQW core, 5, is 1 mm).

Therefore, by decreasing the thickness of the non-doped layers as proposed in the present invention, a low driving voltage can be achieved which has not heretofore been obtained with the traveling-wave electrode structure.

It is needless to say that when only the i-MQW core, 5, works as the non-doped layers and the characteristic impedance Z of the traveling-wave electrode is too low as less than 5Ω and degradation of optical modulation bandwidth cannot be compensated even by decreasing the interaction length L, the characteristic impedance Z may be slightly increased by providing other thin non-doped layer between the i-MQW core, 5, and the n-InP cladding layer, 6, for example, in FIG. 7.

Next, thickness of the total non-doped layers in the present invention will be discussed. Although it has been described that FIG. 6 shows the driving voltage required for realizing an extinction ratio of 20 dB using the thickness D of the total non-doped layers as a variable in the case where the thickness of the i-MQW core, 5, is 0.2 μm, as can be seen from FIG. 6, the driving voltage is the lowest as 1.5V only when the thickness D of the total non-doped layers is only the thickness of the i-MQW core, 5, that is, when there is no other non-doped layers than the i-MQW core, 5. As can be seen in FIG. 6, when the thickness D of the total non-doped layers is gradually increased to 0.3 μm, 0.4 μm, and 0.5 μm, the driving voltage increases, and a drivable driving voltage is obtained if it is less than 0.5 μm. It is needless to say that when a thin non-doped layer is provided between the i-MQW core, 5, and p-InP cladding, 3, the driving voltage is increased more than when the thin non-doped layer is provided between the i-MQW core, 5, and the n-InP cladding, 6, and the effect of the present invention can be achieved as far as the non-doped layer is thin.

<Modification of Second Embodiment>

Since, in the second embodiment shown in FIG. 5, the doping concentration of the p-InP cladding layer, 3, and the n-InP cladding layer, 6, is as high as, for example, $1 \times 10^{18}$/cm$^3$, these layers are high in conductivity as can be regarded as a conductor, and the characteristic impedance Z is low. In a modification of the second embodiment of the present invention described below, the characteristic impedance Z can be increased by adjusting the doping concentration (for example, to $3 \times 10^{17}$/cm$^3$) of the p-InP cladding layer, 3, located above the i-MQW core 5, or the n-InP cladding layer, 6, located beneath the i-MQW core, 5. Further, depending on the value of the doping concentration, the characteristic impedance can be set at 50Ω or more. Still further, it is also possible that microwave resistance component is intentionally increased by adjusting the doping concentration, thereby increasing the apparent characteristic impedance Z. Yet further, since the effective index of the electric signal propagating in the traveling-wave electrode can be adjusted by adjusting the doping concentration, velocity matching can be made between the electric signal and signal light.

Figure 13:
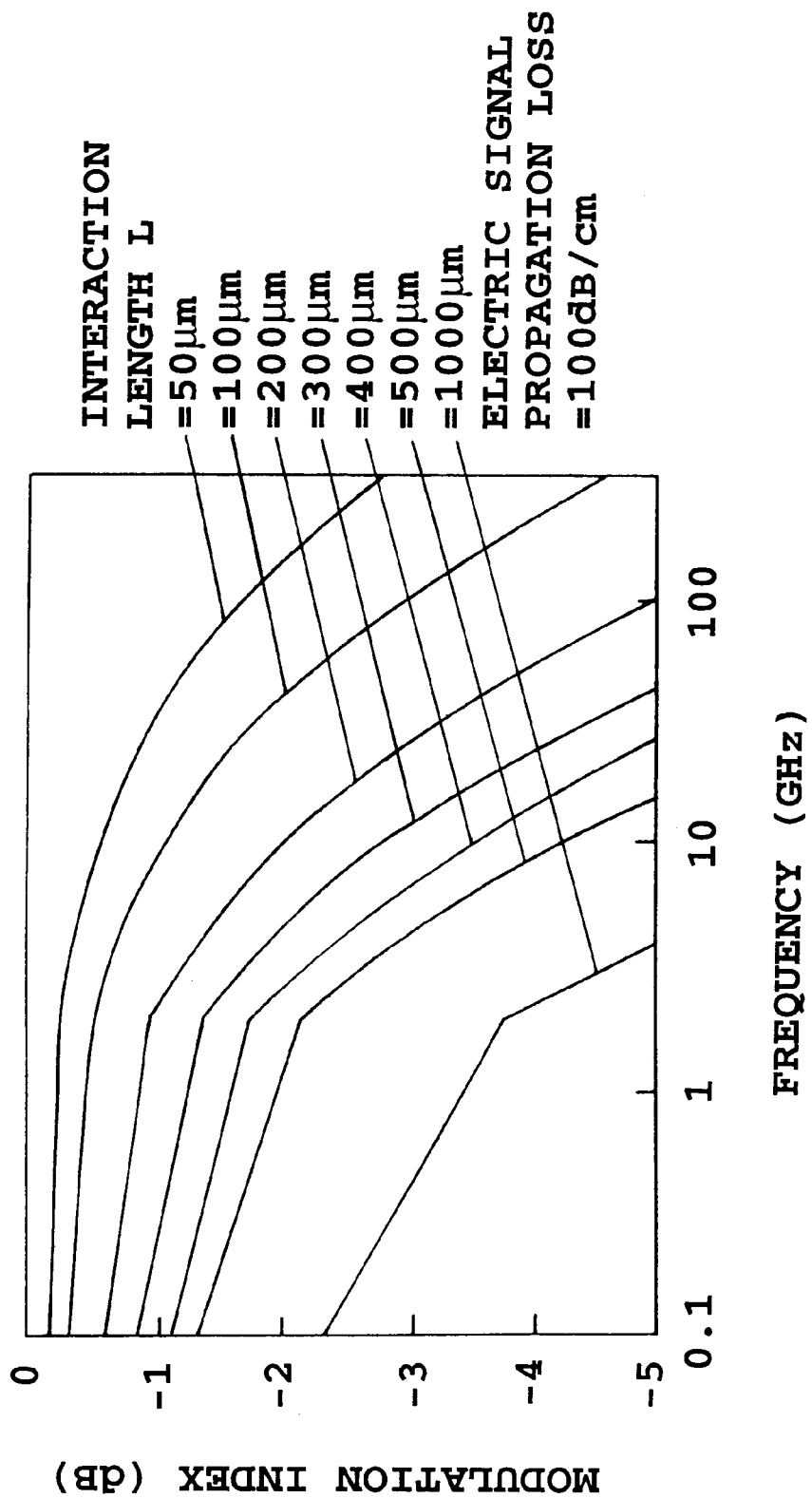
FIG. 13 is a graph for explaining the principle of the second embodiment according to the present invention, showing optical modulation characteristics when a characteristic impedance Z is apparently 35Ω.

FIG. 13 shows optical modulation characteristics when the characteristic impedance Z is apparently 35Ω. When the above-described latter technique, that is, the characteristic impedance Z is corrected so that the resistance of the traveling-wave electrode is increased, in general, the optical modulation bandwidth is narrowed. However, since, in the present invention, the interaction length L is shortened, the effect to apparently increase the characteristic impedance is larger even with these electric signal propagation losses. Thus, a very wide modulation bandwidth can be realized as shown in FIG. 13. That is, in the case of the second embodiment, the optical 3-dB modulation bandwidth Δf becomes wide, and a wider optical modulation bandwidth is possible than the case of the second embodiment shown in FIG. 10 in which only the electric signal loss is increased with the characteristic impedance Z unchanged from 20Ω.

Further, also in the structure where the non-doped layer is provided above or beneath the i-MQW core, 5, in the second embodiment shown in FIG. 5, when reduction of the characteristic impedance is corrected by adjusting the concentration of the doped layer located above or beneath the i-MQW core, 5, the effect of the present invention can be achieved. Also in the case, when the thickness D of the total non-doped layers is gradually increased to 0.3 μm, 0.4 μm, and 0.5 μm, the driving voltage increases. However, a drivable driving voltage can be obtained if it is less than 0.5 μm.

Since, in the present invention, it is sufficient that the electrode is a traveling-wave electrode, it is needless to say that the p-side and n-side electrodes may be of any type, and a semi-insulating substrate may be used as the substrate. Further, the i-MQW core, 5, may be other MQW compositions such as i-InGaAs/InP, and it is also possible to use a quarternary bulk composition such as i-InGaAsP. Still further, unlike the first and second embodiments, the upper portion of the i-MQW core, 5, may be composed of an n-type semiconductor and the lower portion be a p-type semiconductor.

Figure 14:
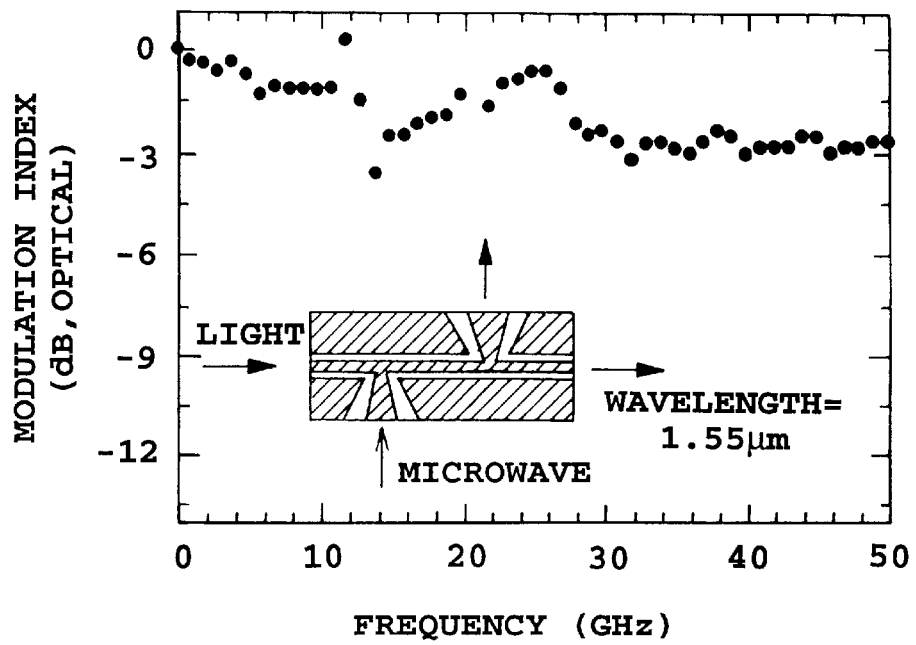
FIG. 14 is a graph showing optical modulation characteristics of an optical modulator fabricated by applying the second embodiment according to the present invention.
Figure 15:
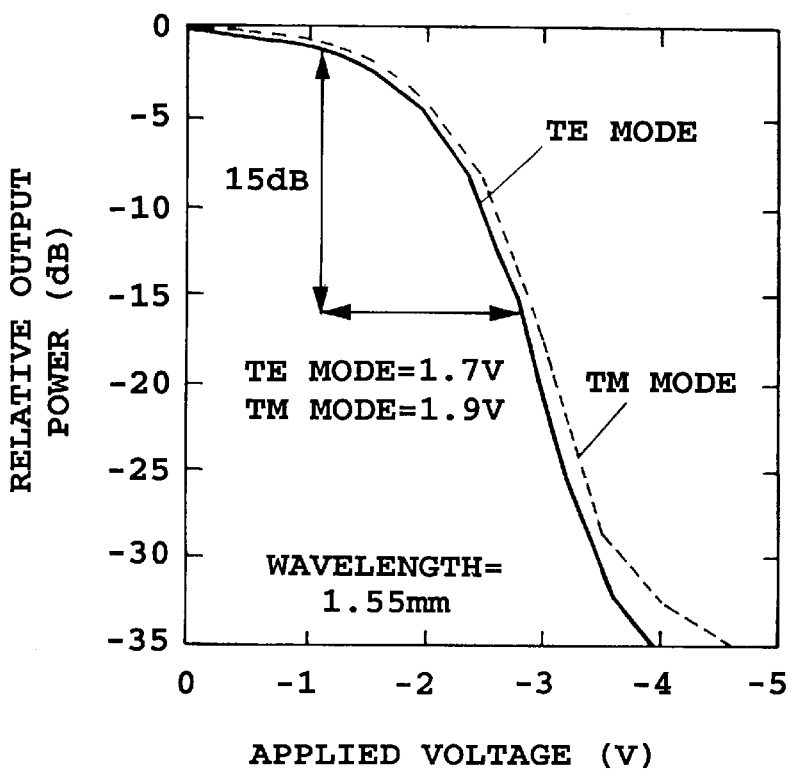
FIG. 15 is a graph showing extinction characteristics of an optical modulator fabricated by applying the second embodiment according to the present invention.

Measured results of optical modulation characteristics and extinction characteristics of wide-band electro-absorption optical modulators fabricated by applying the present invention are respectively shown in FIGS. 14 and 15. The structure of the optical modulators were as shown below individually. A coplanar-waveguide (CPW) electrode was used as the traveling-wave electrode, a 0.2 µm thick MQW was used as the non-doped layer, the InGaAlAs well and the InAlAs barrier were 130 Å and 50 Å, respectively, in thickness, and the exciton-peak wavelength was 1.49 µm. Further, the doping concentration of the p-InP cladding and n-InP cladding was $5\times10^{17}/cm^3$, and a semi-insulating InP substrate was used as the substrate. As can be seen in FIGS. 14 and 15, an optical 3-dB modulation bandwidth of 50 GHz as the measuring instrument limit thereof was obtained and also a low driving voltage under 2 V (in the FIGS. 14 and 15, defined as a voltage required for the insertion loss to increase from 1 dB to 16 dB (15 dB extinction ratio) was obtained.

<Third Embodiment>

Figure 16:
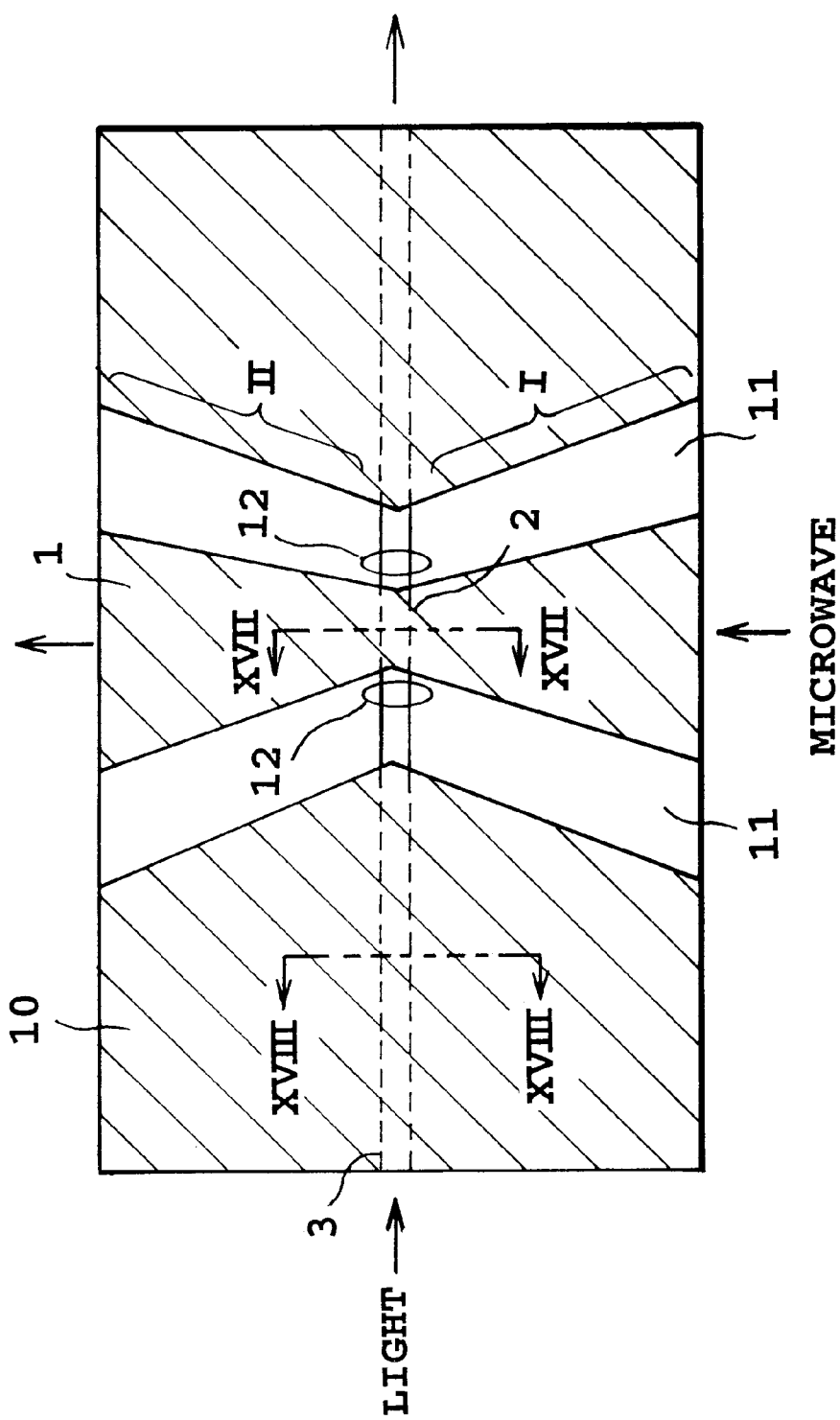
FIG. 16 is a schematic top view showing the structure of the semiconductor optical modulator with a traveling-wave electrode according to the third embodiment.
Figure 17:
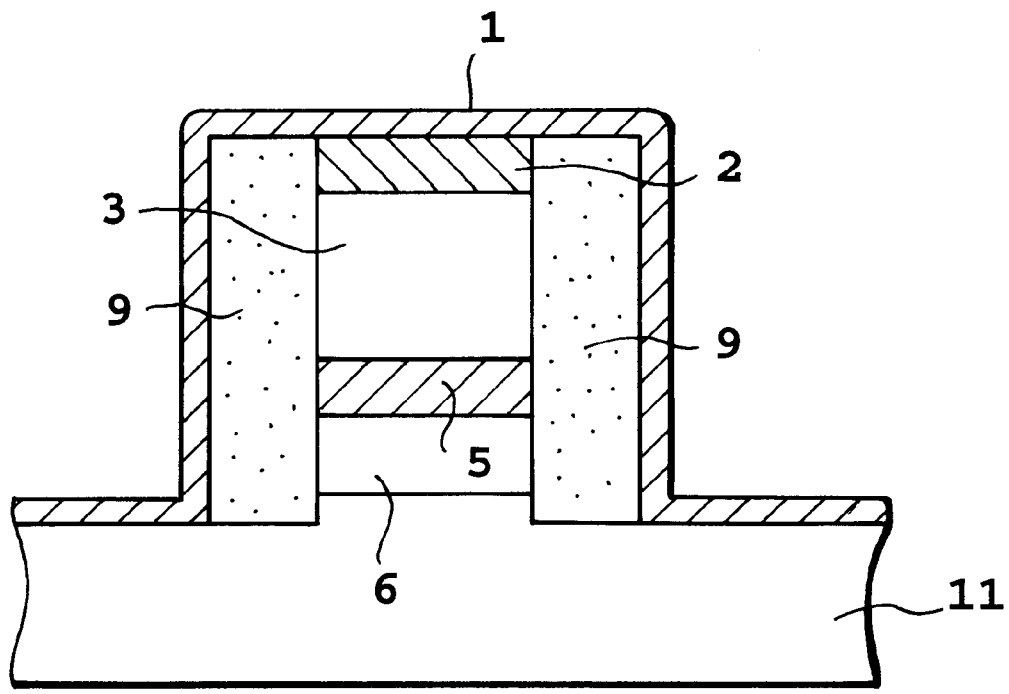
FIG. 17 is a schematic cross-sectional view of the third embodiment of the semiconductor optical modulator with a traveling-wave electrode shown in FIG. 16 at XVII—XVII.
Figure 18:
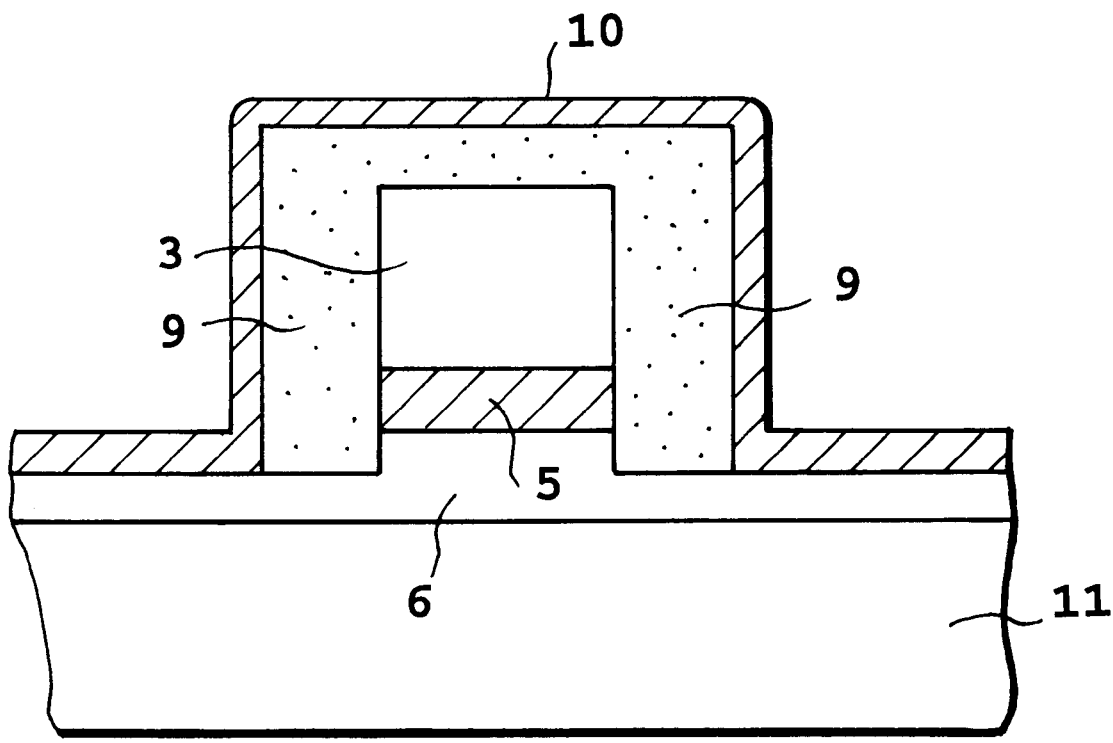
FIG. 18 is a schematic cross-sectional view of the third embodiment of the semiconductor optical modulator with a traveling-wave electrode shown in FIG. 16 at XVIII—XVIII.

FIG. 16 shows a top view of the third embodiment. FIGS. 17 and 18 respectively show cross-sectional views at A–A* and B–B* in FIG. 16. Here, a p-side electrode, 1, and an n-side electrode, 10, are respectively used as the center conductor and earth conductors of the CPW traveling-wave electrode. The substrate, 11, is semi-insulating InP, and 12 is an electrode separation gap. Unlike the structures in FIGS. 5, 7 and 14 the electric signal input port, I, the region for interaction between an electric signal and a light, and the output port, II, are positioned in a straight line. Since this structure does not have bending portions, there is no fear of the electric signal reflections. Further, since the interaction length is about 50 to 400 µm, which is equal to the width of the p-side electrode, 1, the traveling-wave electrode is much wider than those of the structures in FIGS. 5, 7 and 14 (about 1 to 2 µm). Hence, the loss of the electric signal as it propagates to the interaction region is much smaller than the cases in FIGS. 5, 7, and 14. On the other hand, the characteristic impedance of the traveling-wave electrode may be very low. However, since the length of the low characteristic impedance region for the traveling-wave electrode is only the width of the optical waveguide, which is equal to the width of the i-MQW core, 5 (about 1 to 2 µm), the influence of the low characteristic impedance of the traveling-wave electrode on the reflection characteristics of the electric signal is negligibly small.

In this embodiment, the propagation directions of the electric signal and light are perpendicular to each other. This is equivalent to setting the effective index of the electric signal at zero in Eqs. (4) and (5). However, since the interaction length L in these equations is short (as mentioned above, about 50 to 400 µm), wide-band optical modulation is possible. Further, the electric potential distribution is almost uniform on the p-side electrode, 1, along the direction of the light propagation. In other words, the propagation loss of the electric signal along the direction of light propagation is extremely small. This also contributes to the wide-band optical modulation.

In the structure shown in FIG. 16, the propagation directions of the electric signal and the light are perpendicular to each other. However, it is possible to obliquely position the optical waveguide and the traveling-wave electrode. Further, in this case, the electric signal and the light run at a certain angle. Thus, the effective index of the electric signal nm in Eqs. (4) and (5) is not zero. Since the effective index of the electric signal for the light becomes a projected component of the effective index of the electric signal nm along the traveling-wave electrode to the optical waveguide, it is possible to adjust the effective index of the electric signal for the light by appropriately choosing the angle between the propagation directions of the electric signal and the light, i. e., the angle between the optical waveguide and the traveling-wave electrode.

Further, in this embodiment, the characteristic impedance of the traveling-wave electrode can be adjusted by modifying the doping concentration.

As in the second embodiment, when only the i-MQW core, 5, works as the non-doped layer, and the characteristic impedance of the traveling-wave electrode is too low for the outer circuit, the characteristic impedance may be slightly increased by providing the other thin non-doped layer between the i-MQW core, 5, and the n-InP cladding layer, 6, for example.

As described above, with the second embodiment of the present invention, since, in the semiconductor electro-absorption optical modulator sing a traveling-wave electrode, the total thickness D of the non-doped layers is set at a thin thickness, the electric field strength in the core of the optical waveguide is increased. As a result, since shift amount of the absorption-peak wavelength of the core can be increased, it is possible to reduce the driving voltage required to obtain a desired extinction ratio. Further, degradation of optical modulation bandwidth and reflection characteristics of the electric signal due to a mismatching in characteristic impedance between an outer circuit and the semiconductor optical modulator caused by decreasing the total thickness of the non-doped layers can be suppressed by setting the interaction length L of electric signal and light at a short value, and the optical insertion loss can be suppressed to a low value thereby.

Yet further, with the second embodiment of the present invention, in addition to the above-described effects, by adjusting the doping concentration of the doped layer located above or beneath the MQW core, the above-described mismatching in characteristic impedance can be compensated so as to achieve wider bandwidth modulation, and a wideband semiconductor electro-absorption optical modulator with a traveling-wave electrode can be provided, which is superior in terms of driving voltage and optical insertion loss.

Yet further, in the third embodiment of the present invention, like in the second embodiment, the reflection and propagation loss of the electric signal can be greatly suppressed by positioning the electric signal input port, interaction region, and electric signal output port in a straight line.

Therefore, with the present invention, it can be realized that a semiconductor optical modulator which has advantages of a both lumped-element electrode construction and a traveling-wave electrode construction, is low in driving voltage and insertion loss, and has optical modulation characteristics of ultra-wide bandwidth.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An absorption type semiconductor optical modulator configured to receive an optical signal having a long wavelength region, the optical modulator comprising:
   a lower cladding doped semiconductor layer;
   a semiconductor core layer having an interaction length and an absorption peak wavelength, the semiconductor core layer being located above the lower cladding doped semiconductor layer;
   an upper cladding doped semiconductor layer located above the semiconductor core layer; and
   a traveling wave electrode disposed along the interaction length of the semiconductor core layer above the upper cladding doped semiconductor layer and having an electrical signal input member and an electrical signal output member, the semiconductor core layer being configured such that the absorption peak thereof is shifted to the long wavelength region of the optical signal so as to directly absorb the optical signal when a voltage is applied to the traveling wave electrode.

2. An optical modulator as recited in claim 1, wherein the semiconductor core layer is configured such that the absorption peak is shifted to the long wavelength region of the optical signal so as to directly absorb the optical signal when the voltage is applied to the traveling wave electrode and when the interaction length of the semiconductor core layer that interacts with the traveling wave electrode is shorter than a wavelength of the optical signal.

3. An optical modulator as recited in claim 1, wherein the interaction length of the semiconductor core layer is less than about 400 $\mu$m.

4. An optical modulator as recited in claim 1, wherein the traveling wave electrode is configured to receive an electrical signal having a velocity, the semiconductor core layer being configured such that the absorption peak is shifted to the long wavelength region of the optical signal so as to directly absorb the optical signal when the electrical signal, having a velocity unmatched from the velocity of the optical signal, is passed through the traveling wave electrode.

5. An optical modulator as recited in claim 1, wherein the semiconductor core layer has multi-quantum well structure.

6. An optical modulator as recited in claim 1, wherein the semiconductor core layer and the traveling wave electrode are substantially aligned in a straight line.

7. An optical modulator as recited in claim 1, wherein a characteristic impedance mismatching between characteristic impedance of the optical modulator and a characteristic impedance of an outer circuit connected to the traveling wave electrode is compensated.

8. An optical modulator as recited in claim 1, wherein the semiconductor core layer attaches directly to the flower cladding doped semiconductor layer.

9. An optical modulator as recited in claim 1, wherein the semiconductor core layer attaches directly to the upper cladding doped semiconductor layer.

10. An optical modulator as recited in claim 1, wherein a thickness of the semiconductor core layer is decreased so that a driving voltage of the electric signal is reduced.

11. An optical modulator as recited in claim 1, wherein a doping concentration of the lower cladding doped semiconductor layer is adjusted for reducing characteristic impedance mismatching.

12. An optical modulator as recited in claim 1, wherein a doping concentration of the upper cladding doped semiconductor layer is adjusted for reducing characteristic impedance mismatching.

13. An optical modulator as recited in claim 1, wherein the semiconductor core layer has a thickness less than approximately 0.5 $\mu$m.

14. An optical modulator as recited in claim 1, wherein a characteristic impedance of the optical modulator is less than approximately 400 ohms.

15. An optical modulator as recited in claim, 1, wherein the semiconductor core layer has a thickness less than approximately 0.5 $\mu$m and a interaction length less than approximately 400 $\mu$m, and characteristic impedance of the optical modulator is less than approximately 40 ohms.

16. An optical modulator as recited in claim 15, wherein a doping concentration of the lower cladding doped semiconductor layer is adjusted for reducing a characteristic impedance mismatching between characteristic impedance of the optical modulator and a characteristic impedance of an outer circuit connected to the electrode.

17. An optical modulator as recited in claim 15, wherein a doping concentration of the upper cladding doped semiconductor layer is adjusted for reducing a characteristic impedance mismatching between characteristic impedance of the optical modulator and a characteristic impedance of an outer circuit connected to the electrode.

18. An optical modulator as recited in claim 1 further comprising a termination resistor connected to the electrical signal output member.

* * * * *

UNITED STATES PATENT AND TRADEMARK OFFICE
CERTIFICATE OF CORRECTION

PATENT NO. : 5,995,270
DATED : Nov. 30, 1999
INVENTOR(S) : Kenji Kawano

It is certified that error appears in the above-identified patent and that said Letters Patent is hereby corrected as shown below:

Col. 2, line 10, change "$C_{MQW} = \epsilon_{o \cdot er} \cdot W \cdot L/d.$" to --$C_{MQW} = \epsilon_0 \cdot \epsilon_r \cdot W \cdot L/d.$--

Col. 3, line 14, change "$\Delta f 1/(\alpha_m L)^2.$" to --$\Delta f \propto 1/(\alpha_m L)^2.$--

Col. 5, line 18, after "MQW" change "core matching" to --core, mismatching--

Col. 7, line 56, after "may be" insert --composed of--

Col. 8, line 5, after "characteristics" change "is" to --are--

Col. 8, line 24, after "As" insert --is--

Col. 8, line 48, after "ever" change "conducted" to --produced--

Col. 9, line 38, after "invention" change "has not" to --does not have--

Col. 9, line 56, change "Other" to --Another--

Col. 11, line 54, change "layers" to --layer--

Col. 12, line 3, after "there" change "is" to --are--

Col. 12, line 49, after "possible" change "than" to --in--

Col. 14, line 24, after "modulator" change "sing" to --using--

Col. 16, line 4, after "to the" change "flower" to --lower--

UNITED STATES PATENT AND TRADEMARK OFFICE
CERTIFICATE OF CORRECTION

PATENT NO. : 5,995,270
DATED : Nov. 30, 1999
INVENTOR(S) : Kenji Kawano

It is certified that error appears in the above-indentified patent and that said Letters Patent is hereby corrected as shown below:

Col. 16, line 29, after "and" change "a" to --an--.

Signed and Sealed this

Twenty-seventh Day of March, 2001

Attest:

NICHOLAS P. GODICI

Attesting Officer     Acting Director of the United States Patent and Trademark Office